United States Patent
Mawatari et al.

(10) Patent No.: US 8,252,868 B2
(45) Date of Patent: *Aug. 28, 2012

(54) THERMOPLASTIC POLYMER COMPOSITION AND MOLDED PRODUCT

(75) Inventors: Masaaki Mawatari, Tokyo (JP); Tatsuya Toneri, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/289,079

(22) Filed: Nov. 4, 2011

(65) Prior Publication Data

US 2012/0065332 A1 Mar. 15, 2012

Related U.S. Application Data

(60) Division of application No. 12/359,472, filed on Jan. 26, 2009, now Pat. No. 8,084,538, which is a continuation-in-part of application No. PCT/JP2007/000790, filed on Jul. 23, 2007.

(30) Foreign Application Priority Data

| Jul. 27, 2006 | (JP) | 2006-205155 |
| Apr. 20, 2007 | (JP) | 2007-111376 |
| Apr. 25, 2007 | (JP) | 2007-115370 |

(51) Int. Cl.
*C08L 67/04* (2006.01)
*C08L 77/00* (2006.01)
*C08L 83/04* (2006.01)

(52) U.S. Cl. ...... 525/90; 525/92 A; 525/92 B; 525/92 F; 525/166; 525/179; 525/395; 525/397; 525/424; 525/425; 525/432; 525/433; 525/434; 525/437; 525/439; 525/440.01; 525/444

(58) Field of Classification Search ............... 525/90, 525/92 A, 92 B, 92 F, 166, 179, 395, 397, 525/424, 425, 432, 433, 434, 437, 439, 440.01, 525/444

See application file for complete search history.

(56) References Cited

U.S. PATENT DOCUMENTS

| 4,918,132 A | 4/1990 | Hongo et al. |
| 2005/0049360 A1 | 3/2005 | Okamoto |
| 2007/0129475 A1 | 6/2007 | Sakata et al. |

FOREIGN PATENT DOCUMENTS

| JP | 08-231837 | 9/1996 |
| JP | 2004-051959 | 2/2004 |
| JP | 2004-300389 | 10/2004 |
| JP | 2005-105052 | 4/2005 |
| JP | 2005-179550 | 7/2005 |
| JP | 2006-265540 | 10/2006 |
| JP | 2007-186545 | 7/2007 |
| JP | 2007-217445 | 8/2007 |
| WO | WO 91/19520 | 12/1991 |

OTHER PUBLICATIONS

International Search Report for PCT/JP2007/000790, mailed Oct. 9, 2007.

*Primary Examiner* — Ana Woodward
(74) *Attorney, Agent, or Firm* — Nixon & Vanderhye P.C.

(57) ABSTRACT

A thermoplastic polymer composition capable of exhibiting excellent impact resistance, durability and destaticizing property containing (A) 50 to 95% by mass of an aliphatic polyester-based resin and (B) 5 to 50% by mass of a block copolymer of (B1) a hard segment block with at least one of a polyamide, polyester, polyolefin or polyurethane, and (B2) a soft segment block having an ether bond.

6 Claims, No Drawings

THERMOPLASTIC POLYMER COMPOSITION AND MOLDED PRODUCT

This application is a divisional of application Ser. No. 12/359,472 filed Jan. 26, 2009, now U.S. Pat. No. 8,084,538 issued Dec. 27, 2011, which in turn is a Continuation-In-Part of International Application No. PCT/JP2007/000790, filed 23 Jul. 2007, which designated the U.S. and claims priority of Japan Application Nos. 2006-205155, filed 27 Jul. 2006; 2007-111376, filed 20 Apr. 2007; and 2007-115370, filed 25 Apr. 2007, the entire contents of each of which are all hereby incorporated herein by reference.

TECHNICAL FIELD

The present invention relates to a thermoplastic polymer composition having excellent impact resistance, durability and destaticizing property, and a molded product obtained from the thermoplastic polymer composition.

BACKGROUND ART

Aliphatic polyesters have been noticed as a material capable of exhibiting a biodegradability. Further, as a part of the aliphatic polyesters, plastics derived from biomasses instead of the conventional petroleum base materials have been developed and noticed as a material that is effective to take measures against global warming problems, and provides an alternative material for petroleum resources which are expected to be exhausted in future.

However, the aliphatic polyesters not only exhibit problems such as a high hydrolyzability and a poor retention of properties, i.e., a poor durability, under high-temperature and high-humidity conditions, but also undergoes a large limitation to applications thereof when the aliphatic polyesters are used alone, because they generally have a low impact resistance. Therefore, for the purpose of improving an impact resistance of the aliphatic polyesters, there have been proposed a composition comprising a polylactic acid and a modified olefin compound (Patent Document 1); a composition comprising an aliphatic polyester and syndiotactic polypropylene (Patent Document 2); and further a composition comprising a polylactic acid and an ethylene-propylene-diene (EPDM)-based thermoplastic elastomer (Patent Document 3). However, these conventional compositions have failed to exhibit a sufficient effect of improving an impact resistance thereof, and further have such a problem that injection-molded products obtained from these conventional compositions tend to suffer from delamination phenomenon. In addition, the conventional compositions also have a less effect of improving a durability thereof.

On the other hand, the aliphatic polyesters are readily electrically charged and, therefore, have limitations to the applications in which electrostatic disturbance is expected. To solve the above problem, there has been proposed a method of blending an aliphatic polyester, in particular, a polylactic acid, with a nonionic surfactant comprising a glycerol aliphatic polyester to improve an destaticizing property thereof (Patent Document 4). In addition, there has been proposed a method of blending a biodegradable resin with a specific anionic surfactant (Patent Document 5). However, these conventional methods have such a problem that the resulting compositions are insufficient in not only antistatic property but also persistency of the antistatic property. Further, the aliphatic polyesters exhibit a poor durability because they tend to be deteriorated in strength under high-temperature and high-humidity environmental conditions.

Patent Document 1: Japanese Patent Application Laid-Open (KOKAI) No. 9-316310 (1997)
Patent Document 2: Japanese Patent Application Laid-Open (KOKAI) No. 10-251498 (1998)
Patent Document 3: Japanese Patent Application Laid-Open (KOKAI) No. 2002-37987
Patent Document 4: Japanese Patent Application Laid-Open (KOKAI) No. 10-36650 (1998)
Patent Document 5: Japanese Patent Application Laid-Open (KOKAI) No. 2005-264159

DISCLOSURE OF THE INVENTION

Problem to be Solved by the Invention

An object of the present invention is to provide a thermoplastic polymer composition capable of exhibiting excellent impact resistance, durability and destaticizing property, and a molded product obtained from the thermoplastic polymer composition.

Means for Solving the Problem

As a result of the present inventors' earnest study for achieving the above object, it has been found that when blending an aliphatic polyester with a copolymer having a specific block, the resulting thermoplastic polymer composition is excellent in impact resistance and durability. The present invention has been attained on the basis of the above finding.

That is, in a first aspect of the present invention, there is provided a thermoplastic polymer composition comprising (A) 50 to 95% by mass of an aliphatic polyester-based resin and (B) 5 to 50% by mass of a block copolymer comprising (B1) a hard segment block comprising at least one polymer selected from the group consisting of a polyamide, a polyester, a polyolefin and a polyurethane, and (B2) a soft segment block having an ether bond, with the proviso that a total amount of the components (A) and (B) is 100% by mass.

In the preferred embodiment of the present invention, the thermoplastic polymer composition further comprises at least one polymer selected from the group consisting of (C1) a polyester-based resin (except for the components (A) and (B)), (C2) a polyamide-based resin (except for the component (B)), (C3) an acrylic resin, (C4) a polycarbonate-based resin, (C5) a polyacetal-based resin, (C6) a polyphenylene ether-based resin, (C7) a polyolefin-based resin (except for the component (B)) and (C8) a styrene-based resin, wherein a content of the at least one polymer in the composition is 5 to 260 parts by mass on the basis of 100 parts by mass of the total amount of the aliphatic polyester-based resin (A) and the block copolymer (B).

Effect of the Invention

The thermoplastic polymer composition of the present invention is a composition obtained by blending the above components (A) and (B) and, if required, the component (C) as a preferred optional component with each other, and a molded product obtained from the composition is excellent in properties such as, in particular, impact resistance, durability and destaticizing property.

PREFERRED EMBODIMENTS FOR CARRYING OUT THE INVENTION

The present invention is described in detail below. Meanwhile, the "(co)polymerization" as used herein means both of homopolymerization and copolymerization, the "(meth) acrylic" as used herein means acrylic and/or methacrylic, and the "(meth)acrylate" as used herein means an acrylate and/or a methacrylate.

<Aliphatic Polyester (A)>

The aliphatic polyester (A) used in the present invention is not particularly limited. Example of the aliphatic polyester (A) include (i) aliphatic polyesters obtained by subjecting an aliphatic diol and an aliphatic dicarboxylic acid or components mainly comprising functional derivatives thereof to polycondensation, (ii) aliphatic polyesters obtained by subjecting a component mainly comprising an aliphatic oxycarboxylic acid, (iii) aliphatic polyesters obtained by subjecting a component mainly comprising a lactone compound such as ε-caprolactone to polycondensation, etc. Among these compounds, preferred are the aliphatic polyesters (i) and (ii), and more preferred are the aliphatic polyesters (i) and combination of the aliphatic polyesters (i) and (ii). The aliphatic diol as used herein is represented by the following general formula (1).

$$\mathrm{HO-R^1-OH} \tag{1}$$

In the general formula (1), $R^1$ represents a divalent aliphatic hydrocarbon group. $R^1$ has a carbon number of usually 2 to 11 and preferably 2 to 6. $R^1$ may involve a cycloalkylene group and may also have a branched chain. The preferred $R^1$ is "—$(CH_2)_n$—" wherein n is an integer of 2 to 11 and preferably an integer of 2 to 6.

Specific examples of the aliphatic diol include ethylene glycol, trimethylene glycol, 1,3-propanediol, 1,4-butanediol, 1,5-pentanediol, 1,6-hexanediol, 1,4-cyclohexanediol and 1,6-cyclohexane dimethanol. Among these aliphatic diols, from the viewpoint of properties of the obtained aliphatic polyesters, especially preferred is 1,4-butanediol. These aliphatic diols may be used in combination of any two or more thereof.

The aliphatic dicarboxylic acid is represented by the following general formula (2).

$$\mathrm{HOOC-R^2-COOH} \tag{2}$$

In the general formula (2), $R^2$ represents a direct bond or a divalent aliphatic hydrocarbon group. $R^2$ has a carbon number of usually 2 to 11 and preferably 2 to 6. $R^2$ may involve a cycloalkylene group and may also have a branched chain. The preferred $R^2$ is "—$(CH_2)_m$—" wherein m is an integer of 0 or 1 to 11 and preferably an integer of 0 or 1 to 6.

Specific examples of the aliphatic dicarboxylic acid include oxalic acid, succinic acid, glutaric acid, adipic acid, sebacic acid, suberic acid and dodecanoic acid. The derivative of the aliphatic dicarboxylic acid is preferably such a compound obtained by replacing both of two carboxyl groups of the aliphatic dicarboxylic acid with an ester group, etc. Among these compounds, from the viewpoint of properties of the obtained aliphatic polyesters, preferred are succinic acid and adipic acid, and more preferred is succinic acid. The above aliphatic dicarboxylic acids may be used in combination of any two or more thereof.

The aliphatic oxycarboxylic acid is not particularly limited as long as it has one hydroxyl group and one carboxyl group in a molecule thereof. The suitable aliphatic oxycarboxylic acid is represented by the following general formula (3).

$$\mathrm{HO-R^3-COOH} \tag{3}$$

In the general formula (3), $R^3$ represents a divalent aliphatic hydrocarbon group. $R^3$ has a carbon number of usually 1 to 11 and preferably 1 to 16. $R^3$ may involve a cycloalkylene group and may also have a branched chain.

The aliphatic oxycarboxylic acid is preferably such a compound having one carbon atom to which a hydroxyl group and a carboxyl group are bonded, and more preferably a compound represented by the following general formula (4).

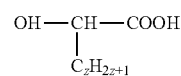

$$\mathrm{OH-\underset{\underset{C_zH_{2z+1}}{|}}{CH}-COOH} \tag{4}$$

In the general formula (4), z is an integer of 0 or 1 or more, preferably 0 or 1 to 10, and more preferably 0 or 1 to 5.

Specific examples of the aliphatic oxycarboxylic acid include lactic acid, glycolic acid, 3-hydroxybutyric acid, 4-hydroxybutyric acid, 2-hydroxy-n-butyric acid, 2-hydroxy-3,3-dimethyl butyric acid, 2-hydroxy-3-methyl butyric acid, 2-methyl lactic acid, 2-hydroxycaproic acid and mixtures of these acids. If the aliphatic oxycarboxylic acids comprise any optical isomer, the optical isomer may be any of a D-isomer, a L-isomer or a racemic mixture. The aliphatic oxycarboxylic acids may be used in the form of any of a solid, a liquid and an aqueous solution. In particular, lactic acid or glycolic acid and an aqueous solution of any of these acids are preferred because they are remarkably increased in polymerization velocity upon use and are readily available. Lactic acid or glycolic acid has been generally put on the market in the form of an aqueous solution having a concentration of 50%, 70% or 90% and, therefore, is more readily available.

The above aliphatic polyesters (i) obtained from the aliphatic diol compound and the aliphatic dicarboxylic acid compound may be copolymerized with the above aliphatic oxycarboxylic acid. In addition, the above aliphatic polyesters (ii) obtained from the oxycarboxylic acid may be copolymerized with the above aliphatic diol component or aliphatic dicarboxylic acid compound. Further, the above aliphatic polyesters (iii) obtained from the lactone compound may be copolymerized with the above aliphatic oxycarboxylic acid compound, aliphatic diol compound or aliphatic dicarboxylic acid compound.

Furthermore, the above aliphatic polyesters (i), (ii) and (iii) may be appropriately copolymerized with the other compounds, e.g., a trifunctional aliphatic oxycarboxylic acid, or an aromatic dicarboxylic acid such as terephthalic acid, isophthalic acid and naphthalenedicarboxylic acid, an aromatic diol such as bisphenol A, an aromatic oxycarboxylic acid such as hydroxybenzoic acid, etc.

As the catalyst used in the esterification reaction for production of the above aliphatic polyesters, there may be used all of known catalysts. Examples of the catalyst include metal compounds that are soluble in the reaction system such as compounds of germanium, titanium, antimony, tin, magnesium, calcium, zinc, etc. Among these metal compounds, preferred are germanium compounds. Specific examples of the germanium compounds include organic germanium compounds such as tetraalkoxy germaniums, and inorganic germanium compounds such as germanium oxide and germanium chloride. Among these germanium compounds, from the viewpoints of low price and good availability, especially preferred are germanium oxide, tetraethoxy germanium and tetrabutoxy germanium.

The amount of the catalyst used is usually 0.001 to 3% by mass and preferably 0.005 to 1.5% by mass based on a total amount of the raw monomers used. The time of addition of the catalyst is not particularly limited as long as it is prior to production of the polyesters. The catalyst may be added to the reaction system upon charging the raw materials or upon initiation of pressure-reducing. It is especially preferred that the catalyst be added to the reaction system simultaneously with addition of the aliphatic oxycarboxylic acid upon charging the raw materials, or added in the form of a solution prepared by dissolving the catalyst in a bifunctional aliphatic oxycarboxylic acid or an aqueous solution thereof.

The conditions used upon production of the aliphatic polyesters such as temperature, time and pressure are not particularly limited as long as the aimed aliphatic polyesters can be obtained under the conditions. The reaction temperature is usually 150 to 260° C. and preferably 180 to 230° C.; the polymerization time is usually not less than 1 hr and preferably 2 to 15 hr; and the reaction pressure (vacuum degree) is usually not more than 10 mmHg and preferably not more than 2 mmHg.

The number-average molecular weight (Mn) of the aliphatic polyester (A) is usually 10000 to 200000 and preferably 20000 to 200000 from the viewpoint of good impact resistance as aimed by the present invention. The ratio of the weight-average molecular weight to the number-average molecular weight (Mw/Mn) of the aliphatic polyester (A) is usually not less than 3 and preferably not less than 4.

In the present invention, from the viewpoint of further improving the impact resistance as one of the objects of the present invention, it is preferred that at least one of the diol component and/or the dicarboxylic acid component (inclusive of derivatives thereof) of the aliphatic polyester-based resin (A) be derived from vegetable materials, and it is more preferred that both of these components be derived from vegetable materials.

Examples of the preferred aliphatic polyester (A) used in the present invention include the above polyester (A1) mainly obtained from 1,4-butanediol and succinic acid, the above polylactic acid-based resin (A2), and combination of the above (A1) and (A2). In this case, the blending ratio of (A1)/(A2) in the mixture of (A1) and (A2) is usually 2 to 70/30 to 98% by mass, preferably 2 to 60/40 to 98% by mass and more preferably 5 to 50/50 to 95% by mass.

<Block Copolymer (B)>

The block copolymer (B) used in the present invention comprises at least one hard segment block (B1) selected from the group consisting of a polyamide, a polyester, a polyolefin and a polyurethane, and a soft segment block (B2) having an ether bond.

The polyamide may be any of (I) polyamides derived from a diamine component and a dicarboxylic acid component, (II) polyamides obtained by ring-opening polymerization of lactams, (III) polyamides derived from an aminocarboxylic acid, copolymers of these polyamides and mixtures of these polyamides.

Examples of the diamine component used for production of the polyamides (I) include aliphatic, alicyclic or aromatic diamines such as ethylenediamine, tetramethylenediamine, hexamethylenediamine, decamethylenediamine, 2,3,4- or 2,4,4-trimethylene hexamethylenediamine, 1,3- or 1,4-bis(aminomethyl)cyclohexane, bis(p-aminohexyl)methane, phenyl diamine, m-xylylenediamine and p-xylylenediamine. Examples of the dicarboxylic acid component used for production of the polyamides (I) include aliphatic, alicyclic or aromatic dicarboxylic acids such as adipic acid, suberic acid, sebacic acid, cyclohexanedicarboxylic acid, terephthalic acid and isophthalic acid. Examples of the lactams used for production of the polyamides (II) include caprolactam and lauryl lactam. Examples of the aminocarboxylic acid used for production of the polyamides (III) include ω-aminocaproic acid, ω-aminoenanthic acid, aminoundecanoic acid and 1,2-aminododecanoic acid.

Examples of the polyester as the hard segment block (B1) include polymers obtained from (1) a dicarboxylic acid component having a carbon number of 4 to 20 and/or an ester-forming derivative thereof and (2) a diol component, polymers obtained from a bifunctional oxycarboxylic acid compound, polymers obtained from a caprolactone compound, and copolymers obtained from a compound selected from the group consisting of the above components (1) and (2), bifunctional oxycarboxylic acid compound and caprolactone compound. As the copolymers, preferred are those copolymers obtained from the above components (1) and (2) and bifunctional oxycarboxylic acid compound. The carbon number as used herein means a total number of carbon atoms contained in the carboxyl group and carbon atoms contained in a chain or a ring directly bonded to the carboxyl group.

Examples of the dicarboxylic acid having a carbon number of 4 to 20 include aliphatic dicarboxylic acids having a carbon number of 4 to 20 such as succinic acid, adipic acid, azelaic acid, sebacic acid, α,ω-dodecanedicarboxylic acid and dodecenyl succinic acid; alicyclic dicarboxylic acids having a carbon number of 8 to 20 such as 1,4-cyclohexanedicarboxylic acid; aromatic dicarboxylic acids having a carbon number of 8 to 12 such as terephthalic acid, isophthalic acid, 1,4-naphthalenedicarboxylic acid, 2,3-naphthalenedicarboxylic acid, 2,6-naphthalenedicarboxylic acid and 2,7-naphthalenedicarboxylic acid; substituted aromatic dicarboxylic acids having a carbon number of 8 to 12 which comprise a sulfonic group bonded to an aromatic ring thereof such as 5-sodium sulfoisophthalic acid, 5-potassium sulfoisophthalic acid and 5-tetrabutyl phosphonium sulfoisophthalic acid; and ester-forming derivatives of these acids such as methyl esters of the above dicarboxylic acids. These dicarboxylic acids may be used in combination of any two or more thereof. Among these dicarboxylic acids, preferred are terephthalic acid, isophthalic acid, 2,6-naphthalenedicarboxylic acid, 5-sodium sulfoisophthalic acid, succinic acid and ester-forming derivatives of these dicarboxylic acids.

AS the diol component, there may be used all compounds previously exemplified as the raw components of the above aliphatic polyester (A). Among these compounds, preferred are ethylene glycol and 1,4-butanediol. In addition, as the diol component, there may also be used lactone compounds such as caprolactone, the bifunctional aliphatic oxycarboxylic acids and bifunctional oxycarboxylic acids previously exemplified as the raw components of the aliphatic polyester (A).

As the polyester used in the present invention, there are preferably used (IV) polyesters obtained from the above dicarboxylic acid or ester-forming derivative thereof and the above diol, and (V) polyesters obtained from the above dicarboxylic acid or ester-forming derivative thereof, the above diol and the above bifunctional oxycarboxylic acid.

The above polyolefin as used herein means a (co)polymer of olefins. Examples of the olefins include α-olefins such as ethylene, propylene, butene-1, hexene-1, 3-methylbutene-1, 4-methylpentene-1 and 3-methylhexene-1; and cyclic olefins such as norbornene. Among these olefins, preferred are ethylene, propylene, butene-1, 3-methylbutene-1, 4-methylpentene-1 and norbornene. These olefins may be used in combination of any two or more thereof. In addition, as a part of the polymer components, there may also be used non-conjugated dienes such as 4-methyl-1,4-hexadiene, 5-methyl-1,4-hexadiene, 7-methyl-1,6-octadiene and 1,9-decadiene. The number-average molecular weight of the polyolefins as measured in terms of polystyrene by gel permeation chromatography (GPO) is usually 800 to 20,000, preferably 1,000 to 10,000 and more preferably 1,200 to 6,000.

The polyolefins may be produced by polymerization method, thermal degradation method, etc. In the polymerization method, olefin is (co)polymerized in the presence of a catalyst. Examples of the catalyst include radical catalysts, metal oxide catalysts, Ziegler-Natta catalysts and metallocene catalysts. On the other hand, the low-molecular weight polyolefins can be readily produced by thermal degradation of high-molecular weight polyolefins, for example, according to the method as described in Japanese Patent Application Laid-Open (KOKAI) No. 3-62804 (1991). When producing the block copolymer (B), it is required to modify a molecular end of the polyolefins. From the viewpoint of facilitated modification of the molecular end group, the polyolefins are preferably obtained by the thermal degradation method.

The polyolefins obtained by the thermal degradation method are usually in the form of a mixture of polyolefins having both molecular end groups capable of being modified, and polyolefins having one molecular end group incapable of being modified. The polyolefins preferably comprise the polyolefins having both molecular end groups capable of being modified as a main component. The number of double bonds in the polyolefins obtained by the thermal degradation method is usually 1 to 40, preferably 2 to 30 and more preferably 4 to 20 per the carbon number of 1000 from the viewpoint of a good destaticizing property. The average number of the double bonds per one molecule of the polyolefins is usually 1.1 to 5, preferably 1.3 to 3 and more preferably 1.8 to 2.2 from the viewpoints of a capability of forming a repeated structure and a good destaticizing property. In the thermal degradation method, low-molecular weight polyolefins having a number-average molecular weight (Mn) of 800 to 6,000 and an average number of end double bonds of 1.5 to 2 per one molecule thereof can be readily produced (for example, refer to MURATA, Katsuhide and MAKING, Tadahiko "Journal of Japan Chemistry Institute", p. 192 (1975)).

As the method for introducing a functional group into the polyolefins, there may be used the method of adding a carbon-to-carbon unsaturated compound having the functional group to the polyolefins that are obtained by the thermal degradation method and have a carbon-to-carbon double bond at molecular ends thereof, etc.

The above polyurethane is obtained from an isocyanate compound and a chain extender. Examples of the isocyanate compound include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylene diisocyanate (XDI), hydrogenated XDI, triisocyanate, tetramethylxylene diisocyanate (TMXDI), 1,6,11-undecane triisocyanate, 1,8-diisocyanate methyl octane, lysine ester triisocyanate, 1,3,6-hexamethylene triisocyanate and bicycloheptane triisocyanate. Among these isocyanates, preferred are 4,4'-diphenylmethane diisocyanate (MDI) and dicyclohexylmethane diisocyanate (hydrogenated MDI; HMDI).

As the chain extender, there may be used low-molecular weight polyols. Examples of the polyols include aliphatic polyols such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, 1,4-cyclohexane dimethanol and glycerol; and aromatic glycols such as 1,4-dimethylol benzene, and ethylene oxide adducts and propylene oxide adducts of bisphenol A.

The polyamide, polyester, polyolefin and polyurethane as the component of the hard segment block (B1) may be used in combination of any two or more thereof. The hard segment block (B1) and the below-mentioned soft segment block (B2) having an ether bond are bonded to each other by at least one bond selected from the group consisting of an ester bond, an amide bond, an ether bond, an urethane bond and an imide bond. For this reason, it is necessary to modify a molecular end of the hard segment block (B1) with a functional group capable of reacting with the molecular end functional group of the soft segment block (B2). Examples of the functional group include a carboxyl group, a hydroxyl group, an amino group, an acid anhydride group, an oxazoline group, an epoxy group, an isocyanate group and an urea group.

Examples of the soft segment block (B2) having an ether bond in the block copolymer (B) include polyether polyols, polyester ether polyols, polyether polyamines and modified products thereof. Further examples of the soft segment block (B2) include polyether ester amides having a polyether polyol segment; polyether ester amide imides having a polyether polyol segment; polyether esters having a polyether polyol segment; polyether amides, polyether polyols and polyester ether polyols having a polyether diamine segment; and polyether urethanes and polyether ureas having a polyether polyamine segment. Among these soft segment blocks, preferred are polyether polyols.

Examples of the polyether polyols include those compounds represented by the following formula (5) or (6).

$$H\text{—}(OA^1)_n\text{-}O\text{-}E^1\text{-}(A^1O)_{n'}\text{—}H \quad (5)$$

$$H\text{—}(OA^2)_m\text{-}O\text{-}E^2\text{-}(A^2O)_{m'}\text{—}H \quad (6)$$

In the general formula (5), $E^1$ is a residual group formed by removing hydroxyl groups from a divalent hydroxyl group-containing compound; $A^1$ is an alkylene group having a carbon number of 2 to 4; and n and n' each represent the number of alkylene oxide adducts per one hydroxyl group in the divalent hydroxyl group-containing compound. The $(OA^1)$ groups in number of n and the $(A^1O)$ groups in number of n' may be the same or different from each other. Also, when these groups are respectively constituted from two or more kinds of oxyalkylene groups, the type of bonding between the groups may be either a block bond, a random bond or combination thereof. The suffixes n and n' are each an integer of usually 1 to 300, preferably 2 to 250 and more preferably 10 to 100, and may be the same or different.

The polyether polyols represented by the above general formula (5) may be produced by addition reaction in which an alkylene oxide is added to the divalent hydroxyl group-containing compound. As the alkylene oxide, there may be used alkylene oxides having a carbon number of 2 to 4, for example, ethylene oxide, propylene oxide, 1,2-butylene oxide, 1,4-butylene oxide, 2,3-butylene oxide, 1,3-butylene oxide, and mixture of any two or more of these compounds. The type of bonding between the two or more kinds of alkylene oxides, if used, may be a random bond and/or a block bond. Examples of the preferred polyether diol polyols include polyethylene glycol, polypropylene glycol, polytetramethylene glycol (PTMG) and co-polyethers thereof. The number of the alkylene oxides added is usually 1 to 300, preferably 2 to 350 and more preferably 10 to 100 per one hydroxyl group in the divalent hydroxyl group-containing compound.

The polyether diols represented by the above general formula (6) are preferably produced by the following methods (i) and (ii), etc.

(i) The method of polymerizing the above divalent hydroxyl group-containing compound as a starting material with a glycidyl ether represented by the following general formula (7), or copolymerizing the divalent hydroxyl group-containing compound with an alkylene oxide having a carbon number of 2 to 4.

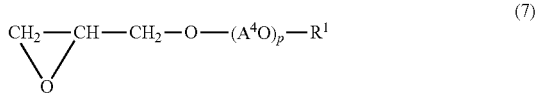

In the general formula (7), $A^4$ is an alkylene group having a carbon number of 2 to 4; p is an integer of 1 to 10; $R^1$ is a hydrogen atom, an alkyl group, an aryl group, an alkylaryl group or an acyl group having a carbon number of 1 to 10.

(ii) The method of producing the polyether diols from the above divalent hydroxyl group-containing compound as a starting material via a polyether having a side chain to which a chloromethyl group is bonded. More specifically, in the method (ii), epichlorohydrin, or epichlorohydrin and an alkylene oxide, are subjected to addition copolymerization to obtain a polyether having a chloromethyl group in a side chain thereof. Then, the resulting polyether is reacted with a poly($C_2$ to $C_4$ alkylene) glycol and $R^1X$ (wherein $R^1$ has the same meaning as defined above; and X is Cl, Br or I) in the presence of an alkali, or the polyether is reacted with a poly($C_2$ to $C_4$ alkylene) glycol monocarbyl ether in the presence of an alkali. As the alkylene oxide having a carbon number of 2 to 4 used in the above method, there may be used all of the alkylene oxides as described previously.

The block copolymer (B) suitably used in the present invention may also be produced by polymerizing the above blocks (B1) and (B2) by known methods. For example, the block copolymer (B) may be produced by subjecting the blocks (B1) and (B2) to polymerization reaction at a temperature of 200 to 250° C. under reduced pressure. In addition, the polymerization reaction may be conducted using a known polymerization catalyst.

The ratio of the block (B1) to the block (B2) in the block copolymer (B) ((B1)/(B2)) is usually 10 to 90/10 to 90% by mass, preferably 20 to 80/20 to 80% by mass and more preferably 30 to 70/30 to 70% by mass.

In the block copolymer (B) produced by using a polyamide as the component of the above block (B1), the number-average molecular weight of the polyamide is usually 500 to 20,000, preferably 500 to 10,000 and more preferably 500 to 5,000. The molecular weight of the thus produced block copolymer (B) is not particularly limited, and may be adjusted such that a reduction viscosity (ηsp/C) thereof is usually 1.0 to 3.0 and preferably 1.2 to 2.5. The reduction viscosity is the value obtained by measuring a viscosity of a formic acid solution of the copolymer with a concentration of 0.5 g/100 mL at 25° C. Examples of the especially preferred block copolymer (B) include polyether ester amides formed by bonding a polyamide and a poly(alkylene oxide) glycol block to each other through an ester bond. Such polyether ester amides are available as commercial products such as "PELLESTAT NC6321", "M-140" and "6500" (tradenames) all produced by Sanyo Kasei Kogyo Co., Ltd.

The molecular weight of the block copolymer (B) produced by using a polyester as the component of the above block (B1) is not particularly limited, and may be adjusted such that a reduction viscosity (ηsp/C) thereof is usually 0.3 to 2.5 and preferably 0.5 to 2.5. The reduction viscosity is the value determined by measuring a viscosity of a solution with a concentration of 1.0 g/100 mL which is prepared by dissolving the copolymer in a mixed solvent comprising phenol and tetrachloroethane at mass ratio of 40/60, at 35° C. Examples of the suitable block copolymer (B) include commercially available products such as "TEP004", "TEP010" and "TEP008" (tradenames) all produced by Takemoto Yushi Co., Ltd.

As the block copolymer (B) produced by using a polyurethane as the component of the above block (B1), there may be suitably used those having a 100% modulus of 2 to 30 MPa as measured according to JIS K7311. Examples of the block copolymer (B) include those commercially available products including "PANDEX T-8000 SERIES" such as "T-8175", "T-8180", "T-8185", "T-8190", "T-8195", "T-8198" and "T-8166"; "DESMONT 500 SERIES" such as "KU2-8659"; "DESMONT 700 SERIES" such as "786"; "DESMONT 900 SERIES" such as "KU2-8670"; and "DP88586A", "DP7-3007", "TEXINE 985", "990", "950", "DP7-1198" and "4210" (tradenames) all produced by D.I.C. Bayer Polymer Corp.

The block copolymer (B) comprising a polyolefin as the component of the above block (B1) may be produced, for example, by the methods as described in Japanese Patent Application Laid-Open (KOKAI) Nos. 2001-278985 and 2003-48990, etc. Examples of such a block copolymer (B) include those commercially available products including "PELLESTAT 300 SERIES" such as "300", "303" and "230" all produced by Sanyo Kasei Kogyo Co., Ltd.

The block copolymer (B) may also be mixed with an organic compound or an inorganic compound which comprises sodium, potassium, lithium, etc., as an electrolyte component. When adding these compounds to the copolymer, the resulting thermoplastic polymer composition of the present invention can be enhanced in destaticizing property.

<Polymer (C)>

The polymer (C) used in the present invention is at least one polymer selected from the group consisting of (C1) a polyester-based resin (except for the components (A) and (B)), (C2) a polyamide-based resin (except for the component (B)), (C3) an acrylic resin, (C4) a polycarbonate-based resin, (C5) a polyacetal-based resin, (C6) a polyphenylene ether-based resin, (C7) a polyolefin-based resin (except for the component (B)) and (C8) a styrene-based resin.

The above polyester-based resin (C1) is produced by subjecting a dicarboxylic acid or an ester-forming derivative thereof and a diol component to polycondensation by known methods. Examples of the dicarboxylic acid include terephthalic acid, isophthalic acid, naphthalene-2,6-dicarboxylic acid and ester-forming derivatives of these acids. Examples of the diol component include poly($C_2$ to $C_6$)methylene glycol such as ethylene glycol, 1,4-butanediol and 1,6-hexanediol, 1,4-cyclohexanediol, bisphenol A, hydroquinone, and ester-forming derivatives of these compounds. The above dicarboxylic acids and diol components are respectively used in combination of any two or more thereof.

As the polyester-based resin (C1), preferred are polybutylene terephthalate, polyethylene terephthalate and polyethylene naphthalate, and more preferred are polybutylene terephthalate and polyethylene terephthalate. These polyester-based resins may be used in combination of any two or more thereof.

The intrinsic viscosity of the polyester-based resin (C1) is not particularly limited. In the case of polybutylene terephthalate, the intrinsic viscosity [η] (unit: dL/g) thereof as measured at 25° C. in o-chlorophenol as a solvent is usually 0.4 to 2.0. In the case of polyethylene terephthalate, the intrinsic viscosity [η](unit: dL/g) thereof as measured at 25° C. in a mixed solvent comprising tetrachloromethane and phenol in equimolar amounts as a solvent is usually 0.5 to 2.0 and preferably 0.5 to 1.5.

Examples of the polyamide-based resin (C2) include polyamides derived from an aliphatic, alicyclic or aromatic polyamine such as ethylenediamine, tetramethylenediamine, hexamethylenediamine, decamethylenediamine, dodecamethylenediamine, 2,2,4-trimethyl hexamethylenediamine, 2,4,4-trimethyl hexamethylenediamine, 1,3-bis(aminomethyl)cyclohexane, 1,4-bis(aminomethyl)cyclohexane, bis(p-aminocyclohexyl)methane, m-xylylenediamine and p-xylylenediamine, and an aliphatic, alicyclic or aromatic dicarboxylic acid; polyamides derived from 6-aminocaproic acid, 1,1-aminoundecanoic acid, 1,2-aminododecanoic acid, etc.; and copolymers or mixtures of these polyamides. Among these polyamide-based resins, preferred are nylon 6 (polycaproamide), nylon 6,6 (polyhexamethylene adipamide), nylon 12 (polydodecamide), nylon 6,10 (polyhexamethylene sebacamide), nylon 4,6 (polytetramethylene adipamide), and copolymers or mixtures of these compounds.

The polymerization degree of the polyamide-based resin (C2) is not particularly limited, and may be controlled such that the relative viscosity thereof is usually 1.6 to 6.0 and preferably 2.0 to 5.0. The relative viscosity is the value determined by measuring a viscosity of a solution prepared by dissolving 2 g of the polymer in 100 mL of formic acid (purity: 90% by mass), at 30° C.

The acrylic resin (C3) comprises a (meth)acrylic ester monomer unit having an ester group formed from a secondary alcohol or a tertiary alcohol and a carboxylic acid.

Examples of the (meth)acrylic ester monomer include methacrylic acid esters such as methyl methacrylate, ethyl methacrylate, n-propyl methacrylate, isopropyl methacrylate, n-butyl methacrylate, isobutyl methacrylate, t-butyl methacrylate, isoamyl methacrylate, lauryl methacrylate, dodecyl methacrylate, phenyl methacrylate, benzyl methacrylate, 2-ethylhexyl methacrylate, cyclopentyl methacrylate, cyclohexyl methacrylate, cycloheptyl methacrylate, cyclooctyl methacrylate, 4-t-butylcyclohexyl methacrylate, 3,3,5-trimethylcyclohexyl methacrylate, tricyclodecanyl methacrylate, dicyclopentadienyl methacrylate, isobornyl methacrylate, adamantyl methacrylate and triphenylmethyl methacrylate.

Further examples of the (meth)acrylic ester monomer include acrylic acid esters such as methyl acrylate, ethyl acrylate, n-propyl acrylate, isopropyl acrylate, n-butyl acrylate, isobutyl acrylate, t-butyl acrylate, isoamyl acrylate, lauryl acrylate, dodecyl acrylate, phenyl acrylate, benzyl acrylate, glycidyl acrylate and 2-ethylhexyl acrylate, as well as cyclopentyl acrylate, cyclohexyl acrylate, cycloheptyl acrylate, cyclooctyl acrylate, 4-t-butylcyclohexyl acrylate, 3,3,5-trimethylcyclohexyl acrylate, tricyclodecanyl acrylate, dicyclopentadienyl acrylate, isobornyl acrylate, adamantyl acrylate, diphenylmethyl acrylate and triphenylmethyl acrylate.

Further, the above (meth)acrylic esters may be appropriately copolymerized with the other monomer copolymerizable therewith. Examples of the other monomer copolymerizable with the above (meth)acrylic esters include branched or linear chain-like olefins such as ethylene, propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclic olefins such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene; α,β-unsaturated carboxylic acids such as fumaric acid, maleic anhydride, itaconic acid, itaconic anhydride and bicyclo[2.2.1]-5-heptene-2,3-dicarboxylic anhydride; and N-phenyl maleimide, N-cyclohexyl maleimide and N-t-butyl maleimide.

The chemical structure of the acrylic resin (C3) is not particularly limited, and may be in the form of a random copolymer, a graft copolymer or a block copolymer. The number-average molecular weight of the acrylic resin (C3) is usually 5,000 to 500,000 and preferably 10,000 to 300,000. The acrylic resin (C3) may be produced by known polymerization methods such as, for example, radical polymerization, charge transfer radical polymerization, anionic polymerization, group transfer polymerization and coordination anionic polymerization.

As the above polycarbonate-based resin (C4), there is preferably used an aromatic polycarbonate. As the aromatic polycarbonate, there may be used all of aromatic polycarbonates produced by known polymerization methods such as the method of subjecting a hydroxyaryl compound and phosgene to interfacial polycondensation, the method of subjecting a dihydroxyaryl compound and a carbonate compound such as diphenyl carbonate to transesterification reaction (melt polycondensation), etc.

Examples of the above dihydroxyaryl compound include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)propane, 2,2-bis(4-hydroxy-3-t-butylphenyl)propane, 2,2-bis(4-hydroxy-3-t-butylphenyl)propane, 1,1-bis(4-hydroxyphenyl)cyclopentane, 1,1-bis(4-hydroxyphenyl)cyclohexane, 4,4'-dihydroxydiphenyl ether, 4,4'-dihydroxydiphenyl sulfide, 4,4'-dihydroxy-3,3'-dimethylphenyl sulfoxide, 4,4'-dihydroxyphenyl sulfone, 4,4'-dihydroxy-3,3'-dimethyldiphenyl sulfone, hydroquinone and resorcin, as well as hydroxyaryloxy-terminated polyorganosiloxanes (for example, refer to U.S. Pat. No. 3,419,634). These dihydroxyaryl compounds may be used in combination of any two or more thereof. Among these dihydroxyaryl compounds, preferred is 2,2-bis(4-hydroxyphenyl)propane (bisphenol A).

The viscosity-average molecular weight of the polycarbonate-based resin (C4) is usually 13,000 to 32,000, preferably 17,000 to 31,000 and more preferably 18,000 to 30,000. As the polycarbonate-based resin, two or more kinds of various aromatic polycarbonates may be used in combination. In addition, as the polycarbonate-based resin, the aromatic polycarbonates that are different in viscosity-average molecular weight from each other may also be used in combination.

The viscosity-average molecular weight of the aromatic polycarbonate may be usually calculated by inserting a specific viscosity ($\eta sp$) of the aromatic polycarbonate as measured at 20° C. in a methylene chloride solvent at a concentration of 0.7 g/100 mL (methylene chloride), into the following formula (I).

$$\text{Viscosity-average molecular weight} = ([\eta] \times 8130)^{1.205} \quad \text{(I)}$$

In the formula (I), $[\eta]=[(\eta sp \times 1.121+1)1/2-1]0.56C$ wherein C represents the concentration.

The polycarbonate-based resin obtained by interfacial polycondensation may comprise various chlorine compounds. These chlorine compounds tend to sometimes have any adverse influence on durability of the thermoplastic polymer composition of the present invention. Therefore, the content of these chlorine compounds in the composition is usually not more than 300 ppm and preferably not more than 100 ppm in terms of a chlorine atom.

The polyacetal-based resin (C5) is a polymer compound having an oxymethylene group (—OCH$_2$—) as a main structural unit. Typical examples of the polyacetal-based resin include polyacetal homopolymers substantially comprising repeated oxymethylene units only, and polyacetal copolymers comprising other comonomer units in addition to the oxymethylene units. The polyacetal-based resin basically has a linear molecular structure. Further examples of the polyacetal-based resin include polyacetal copolymers into which a branched structure or a crosslinked structure is introduced by copolymerizing with a branched structure-forming component or a crosslinked structure-forming component, and block copolymers or graft copolymers comprising the repeated oxymethylene units and other polymer units. These polyacetal-based resins may be used in combination of any two or more thereof. In particular, combination of a linear polyacetal resin and a small amount of a branched or crosslinked polyacetal resin is one of suitable examples thereof.

In general, the polyacetal homopolymer may be produced by polymerizing an anhydrous formaldehyde or trioxane (cyclic trimer of formaldehyde), and may be stabilized against thermal decomposition by esterifying a terminal end thereof.

In general, the polyacetal copolymer may be produced by copolymerizing formaldehyde or a cyclic oligomer of formaldehyde as a main monomer with a compound selected from the group consisting of cyclic ethers and cyclic formals as a comonomer, and may be stabilized against thermal decomposition by usually hydrolyzing the resulting copolymer to remove unstable end portions therefrom. In general, as the main monomer of the polyacetal copolymer, there is used trioxane as a cyclic trimer of formaldehyde. In general, the trioxane may be obtained by reacting a formaldehyde aqueous solution in the presence of an acid catalyst and then purifying the resulting reaction product by distillation, etc. The trioxane preferably comprises substantially none of impurities such as water, methanol and formic acid.

Examples of cyclic ethers and cyclic formals as the comonomer of the polyacetal-based resin include ethyleneoxide, propyleneoxide, butyleneoxide, cyclohexeneoxide, oxetane, tetrahydrofuran, trioxepane, 1,3-dioxane, 1,3-dioxolane, propylene glycol formal, diethylene glycol formal, triethylene glycol formal, 1,4-butanediol formal and 1,6-hexanediol formal.

Further, examples of the comonomer component capable of forming the branched structure or crosslinked structure include alkyl or aryl glycidyl ethers such as methyl glycidyl ether, ethylene glycidyl ether, butyl glycidyl ether, phenyl glycidyl ether and naphthyl glycidyl ether; and alkylene or polyalkylene glycol diglycidyl ethers such as ethylene glycol diglycidyl ether, triethylene glycol diglycidyl ether and butanediol diglycidyl ether. These comonomers may be used in combination of any two or more thereof.

From the viewpoint of reducing generation of formaldehyde from the polyacetal-based resin (C5) to a lower level, there is suitably used polyacetal copolymers. In particular, preferred are such polyacetal copolymers obtained by copolymerizing trioxane (C5-a) with at least one compound (C5-b) selected from the group consisting of cyclic ethers and cyclic formals at a mass ratio ((C5-a)/(C5-b)) of 99.9/0.1 to 80.0/20.0, and more preferred are those copolymers obtained by copolymerizing these components at a mass ratio ((C5-a)/(C5-b)) of 99.5/0.5 to 90.0/10.0.

Also, among the compounds selected from the cyclic ethers and the cyclic formals, preferred are ethyleneoxide, 1,3-dioxolane, 1,4-butanediol formal and diethylene glycol formal.

In general, the above polyacetal copolymers may be obtained by adding an adequate amount of a molecular weight controller to the raw monomers to subject the raw monomers to cationic polymerization in the presence of a cationic polymerization catalyst. The molecular weight controller, cationic polymerization catalyst, cationic polymerization method, polymerizer, deactivation treatment of the catalyst after polymerization, terminal stabilization treatment of the crude acetal copolymer obtained by the polymerization, etc., used in the above polymerization process are conventionally known from many literatures. Any of these known conditions can be basically used in the present invention.

The weight-average molecular weight of the polyacetal-based resin (C5) is usually 10,000 to 400,000, and the melt index of the polyacetal-based resin (C5) as an index of fluidity thereof (as measured at 190° C. under a load of 2.16 kg according to ASTM-D1238) is usually 0.1 to 100 g/10 min and preferably 0.5 to 80 g/10 min.

The polyphenylene ether-based resin (C6) is represented by the following general formula (8).

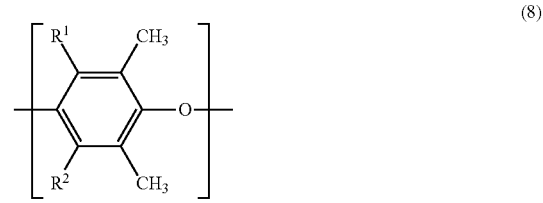

(8)

In the general formula (8), R$^1$ and R$^2$ are each independently a hydrogen atom or a substituted or unsubstituted hydrocarbon having a total carbon number of 1 to 20.

Examples of the above hydrocarbon group include an alkyl group having a total carbon number of 1 to 20 such as methyl, ethyl, n-propyl, isopropyl, n-butyl, isobutyl, t-butyl, pentyl, cyclopentyl, hexyl, cyclohexyl, octyl and decyl; an aryl group having a total carbon number of 6 to 20 such as phenyl, 4-methyl phenyl, 1-naphthyl and 2-naphthyl; and an aralkyl group having a total carbon number of 7 to 20 such as benzyl, 2-phenyl ethyl and 1-phenyl ethyl. Examples of the substituent groups contained in the hydrocarbon group include a halogen atom such as a fluorine atom, a chlorine atom and a bromine atom; an alkoxy group such as t-butyloxy; and a diarylamino group such as 3-diphenylamino. Specific examples of the hydrocarbon group having the substituent group include trifluoromethyl, 2-t-butyloxyethyl and 3-diphenylaminopropyl. Meanwhile, the above total carbon number does not include the carbon number of the substituent group.

In the general formula (8), R$^1$ and R$^1$ are each preferably a hydrogen atom or a methyl group and more preferably a hydrogen atom.

The polyphenylene ether-based resin (C6) having a structural unit represented by the general formula (8) may be in the form of either a homopolymer or a copolymer having, in addition to the structural unit represented by the general formula (8), a structural unit derived from a phenol compound monomer other than the phenol compound corresponding to those represented by the general formula (8). Examples of such a phenol compound include polyhydroxy aromatic compounds such as, for example, bisphenol A, tetrabromobisphenol A, resorcin, hydroquinone and novolak resins. The content of the structural unit represented by the general formula (8) in the copolymer is usually not less than 80 mol % and preferably not less than 90 mol %.

The polyphenylene ether-based resin (C6) having the structural unit represented by the general formula (8) may be produced by subjecting a phenol compound represented by the following general formula (9) to oxidative polymerization. In the general formula (9), $R^1$ and $R^2$ respectively have the same meaning as defined in the above general formula (8).

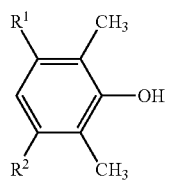

(9)

When using the phenol compound represented by the above general formula (9) solely, the above homopolymer can be produced. These phenol compounds may be used in combination of any two or more thereof. Further, when using the phenol compound represented by the general formula (9) in combination with the other phenol compound, the above copolymer can be produced.

The oxidative polymerization may be conducted in the presence of an oxidation coupling catalyst by using an oxidizing agent, for example, oxygen or an oxygen-containing gas. The oxidation coupling catalyst used in the oxidative polymerization is not particularly limited, and any of catalysts capable of exhibiting a polymerization activity may be used as the oxidation coupling catalyst. Typical examples of the oxidation coupling catalyst include catalysts comprising cuprous chloride or divalent manganese salts (for example, refer to Japanese Patent Application Laid-Open (KOAKI) No. 60-229923 (1985)).

The polyphenylene ether-based resin (C6) may be used singly or in combination with polystyrene and/or impact polystyrene obtained by polymerizing styrene in the presence of a rubber polymer. In the preferred embodiment, the polyphenylene ether-based resin (C6) and the impact polystyrene are used in combination thereof at a mass ratio ((C6)/(impact polystyrene)) of 10 to 90/90 to 10. Further, the combination of the polyphenylene ether-based resin (C6) and the impact polystyrene may further comprise known styrene-butadiene-based block copolymer or hydrogenated styrene-butadiene block copolymer in an amount of not more than 30% by mass.

The above polyolefin (C7) comprises at least one olefin having a carbon number of usually 2 to 10. Examples of the olefin include α-olefins such as ethylene, propylene, butene-1, pentene-1, hexene-1, 3-methyl butene-1, 4-methyl pentene-1 and 3-methyl hexene-1; and cyclic olefins such as norbornene. These olefins may be used in combination of any two or more thereof. Among these olefins, preferred are ethylene, propylene, butene-1, 3-methyl butene-1, 4-methyl pentene-1 and norbornene. Examples of the other monomer which may be contained in the polyolefin-based resin (C7) include non-conjugated dienes such as 4-methyl-1,4-hexadiene, 5-methyl-1,4-hexadiene, 7-methyl-1,6-octadiene and 1,9-decadiene.

In addition, the still other monomer may be copolymerized with the polyolefin. Examples of the still other monomer include (meth)acrylic acid, methyl(meth)acrylate, ethyl (meth)acrylate, the below-mentioned epoxy group-containing unsaturated compounds, hydroxyl group-containing unsaturated compounds and acid anhydride group-containing unsaturated compounds.

The polyolefin-based resin (C7) is preferably polypropylene or a polymer comprising a propylene unit such as a propylene/ethylene copolymer as a main component, as well as is also preferably polyethylene or a polymer comprising an ethylene unit such as an ethylene/norbornene copolymer as a main component. Among these polymers, preferred are polypropylene, a propylene/ethylene copolymer and polyethylene. These polymers may be used in combination of any two or more thereof. Meanwhile, the various copolymers used above may be in the form of any of a random copolymer and a block copolymer. In addition, the polyethylene used above may be any of high-density polyethylene, low-density polyethylene and linear low-density polyethylene.

The polyolefin-based resin (C7) may be produced by known polymerization methods such as high-pressure polymerization method, low-pressure polymerization method and metallocene catalyst polymerization method. Further, there are also preferably used polyolefin-based resins such as those obtained by removing the polymerization catalyst therefrom and those obtained by removing low-molecular weight compounds therefrom.

The crystallinity of the polyolefin-based resin (C7) is not particularly limited. In the polyolefin-based resin (C7), there is preferably used at least one polyolefin-based resin having a crystallinity of not less than 10% as measured at room temperature by X-ray diffraction. Further, the polyolefin-based resin (C7) preferably comprises at least one polyolefin-based resin having a melting point of not lower than 40° C. as measured according to JIS K7121.

The polypropylene-based resin used as the polyolefin-based resin (C7) has a melt flow rate of usually 0.01 to 500 g/10 min and preferably 0.05 to 100 g/10 min as measured according to JIS K210:1999 (at 230° C. under a load of 2.16 kg), and the polyethylene-based resin used as the polyolefin-based resin (C7) has a melt flow rate of usually 0.01 to 500 g/10 min and preferably 0.05 to 100 g/10 min as measured according to JIS K6922-2 (at 190° C. under a load of 2.16 kg).

The above styrene-based resin (C8) is a rubber-reinforced styrene-based resin obtained by polymerizing a vinyl-based monomer (b) comprising an aromatic vinyl compound in the presence of a rubber polymer and/or a (co)polymer of the vinyl-based monomer (b).

The styrene-based resin (C8) preferably comprises at least one polymer obtained by subjecting the vinyl-based monomer to graft polymerization in the presence of the rubber polymer from the viewpoint of a good impact resistance. The content of the rubber polymer in the styrene-based resin (C8) is usually 3 to 80% by mass, preferably 5 to 70% by mass and more preferably 10 to 60% by mass based on 100% by mass of the styrene-based resin (C8).

The rubber polymer (a) is not particularly limited. Examples of the rubber polymer (a) include polybutadiene, butadiene-styrene copolymers, butadiene-acrylonitrile copolymers, ethylene-propylene copolymers, ethylene-propylene-non-conjugated diene copolymers, ethylene-butene-1 copolymers, ethylene-butene-1-non-conjugated diene copolymers, acrylic rubbers, silicone rubbers, silicone-acrylic IPN rubbers, etc. These rubber polymers may be used in combination of any two or more thereof. Among these rubber polymers, preferred are polybutadiene, butadiene-styrene copolymers, ethylene-propylene copolymers, ethylene-propylene-non-conjugated diene copolymers, acrylic rubbers and silicone rubbers. Meanwhile, the butadiene-styrene copolymers may be usually used in the form of a copolymer other than a block copolymer, in particular, a random copolymer.

The gel content in the rubber polymer (a) is not particularly limited. When the rubber polymer component is obtained by emulsion polymerization, the gel content in the rubber polymer is usually not more than 98% by mass and preferably 40 to 98% by mass. When controlling the gel content in the rubber polymer to the above-specified range, it is possible to obtain a destaticizing resin composition capable of providing, in particular, a multilayer sheet having an excellent impact resistance.

Meanwhile, the gel content may be determined by the following method. That is, 1 g of the rubber polymer is charged into 100 mL of toluene, and allowed to stand at room temperature for 48 hr. Thereafter, a toluene insoluble solution prepared by filtering the resulting mixture through a 100-mesh wire netting (mass: W1 grams) and the wire netting are dried in vacuo at 80° C. for 6 hr to measure dried weights thereof (mass: W2 grams). The gel content in the rubber polymer is calculated according to the following formula (II).

$$\text{Gel content}(\% \text{ by mass}) = [\{W2 (g) - W1 (g)\}/1 (g)] \times 100 \quad \text{(II)}$$

The gel content may be controlled by appropriately adjusting the kind and amount of molecular weight controller, polymerization time, polymerization temperature, polymerization conversion rate, etc., upon production of the rubber polymer.

Examples of the aromatic vinyl compound constituting the above vinyl-based monomer (b) include styrene, α-methyl styrene and hydroxystyrene. Among these aromatic vinyl compounds, preferred are styrene and α-methyl styrene.

Examples of the other vinyl-based monomer capable of being copolymerized with the aromatic vinyl compound include a vinyl cyanide compound, a (meth)acrylic ester compound, a maleimide compound and various other functional group-containing unsaturated compounds.

In the preferred embodiment, the vinyl-based monomer (b) comprises the aromatic vinyl compound as an essential monomer component, if required, in combination with at least one optional monomer component selected from the group consisting of a vinyl cyanide compound, a (meth) acrylic ester compound and a maleimide compound, and further, if required, together with at least one additional optional monomer component selected from the group consisting of various other functional group-containing unsaturated compounds. Examples of the functional group-containing unsaturated compounds include unsaturated acid compounds, epoxy group-containing unsaturated compounds, hydroxyl group-containing unsaturated compounds, oxazoline group-containing unsaturated compounds, acid anhydride group-containing unsaturated compounds and substituted or unsubstituted amino group-containing compounds. The above various functional group-containing unsaturated compounds may be used in combination of any two or more thereof.

Examples of the above vinyl cyanide compound include acrylonitrile and methacrylonitrile. These vinyl cyanide compounds may be used in combination of any two or more thereof. When using the vinyl cyanide compound as the other vinyl-based monomer, a good chemical resistance can be imparted to the resulting resin. The amount of the vinyl cyanide compound used in the vinyl-based monomer (b) is usually 1 to 60% by mass and preferably 5 to 50% by mass.

Examples of the above (meth)acrylic ester compound include methyl acrylate, ethyl acrylate, butyl acrylate, methyl methacrylate, ethyl methacrylate and butyl methacrylate. These (meth)acrylic ester compounds may be used in combination of any two or more thereof. When using the (meth) acrylic ester compound as the other vinyl-based monomer, the resulting molded product can be enhanced in surface hardness. The amount of the (meth)acrylic ester compound used in the vinyl-based monomer (b) is usually 1 to 80% by mass and preferably 5 to 80% by mass.

Examples of the above maleimide compound include maleimide, N-phenyl maleimide and N-cyclohexyl maleimide. These maleimide compounds may be used in combination of any two or more thereof. In addition, in order to introduce an maleimide unit into the styrene-based resin, maleic anhydride may be copolymerized with the aromatic vinyl compound, and then the resultant copolymer may be subjected to imidization. When using the maleimide compound as the other vinyl-based monomer, a good heat resistance can be imparted to the resulting resin. The amount of the maleimide compound used in the vinyl-based monomer (b) is usually 1 to 60% by mass and preferably 5 to 50% by mass.

Examples of the unsaturated compound include acrylic acid, methacrylic acid, ethacrylic acid, maleic acid, fumaric acid, itaconic acid, crotonic acid and cinnamic acid. These unsaturated compounds may be used in combination of any two or more thereof.

Examples of the epoxy group-containing compound include glycidyl acrylate, glycidyl methacrylate and allyl glycidyl ether. These epoxy group-containing compounds may be used in combination of any two or more thereof.

Examples of the hydroxyl group-containing compound include 3-hydroxy-1-propane, 4-hydroxy-1-butene, cis-4-hydroxy-2-butene, trans-4-hydroxy-2-butene, 3-hydroxy-2-methyl-1-propene, 2-hydroxyethyl methacrylate, 2-hydroxyethyl acrylate and N-(4-hydroxyphenyl)maleimide. These hydroxyl group-containing compounds may be used in combination of any two or more thereof.

Examples of the oxazoline group-containing compound include vinyl oxazoline. These oxazoline group-containing compounds may be used in combination of any two or more thereof.

Examples of the acid anhydride group-containing compound include maleic anhydride, itaconic anhydride and citraconic anhydride. These acid anhydride group-containing compounds may be used in combination of any two or more thereof.

Examples of the substituted or unsubstituted amino group-containing compound include aminoethyl acrylate, propylaminoethyl acrylate, dimethylaminoethyl methacrylate, phenylaminoethyl methacrylate, N-vinyldiethyl amine, N-acetylvinyl amine, acrylamine, methacrylamine, N-methyl acrylamine, acrylamide, N-methyl acrylamide and p-aminostyrene. These substituted or unsubstituted amino group-containing compounds may be used in combination of any two or more thereof.

When using various functional group-containing unsaturated compounds described above as the other vinyl-based monomer, a compatibility between the styrene-based resin (C8) and the other polymer can be enhanced upon blending both the components with each other. Examples of the preferred monomer for achieving the above effect include epoxy group-containing unsaturated compounds, unsaturated acid compounds and hydroxyl group-containing unsaturated compounds.

The total amount of the above functional group-containing unsaturated compounds used in the styrene-based resin (C8) is usually 0.1 to 20% by mass and preferably 0.1 to 10% by mass based on a total amount of the styrene-based resin (C8).

The amount of the monomers other than the aromatic vinyl compound in the vinyl-based monomer (b) is usually not more than 80% by mass, preferably not more than 60% by mass and more preferably not more than 40% by mass based on 100% by mass in total of the vinyl-based monomer (b).

Examples of preferred combination of the monomers constituting the vinyl-based monomer (b) include styrene/acrylonitrile, styrene/methyl methacrylate, styrene/acrylonitrile/methyl methacrylate, styrene/acrylonitrile/glycidyl methacrylate, styrene/acrylonitrile/2-hydroxyethyl methacrylate, styrene/acrylonitrile/(meth)acrylic acid, styrene/N-phenyl maleimide, and styrene/methyl methacrylate/cyclohexyl maleimide. Among these combinations, especially preferred is styrene/acrylonitrile.

Examples of the preferred combination (and contents) of the monomers that are polymerized in the presence of the rubber polymer (a) include styrene/acrylonitrile (mass ratio: 65/45 to 90/10), styrene/methyl methacrylate (mass ratio: 80/20 to 20/80) and styrene/acrylonitrile/methyl methacrylate (in which the styrene content is 20 to 80% by mass, and the total content of acrylonitrile and methyl methacrylate optionally lies in the range of 20 to 80% by mass). Among them, especially preferred is combination of styrene/acrylonitrile (mass ratio: 70/30 to 85/15).

The styrene-based resin (C8) may be produced by known polymerization methods such as, for example, emulsion polymerization, bulk polymerization, solution polymerization, suspension polymerization and combination of these polymerization methods. Among these methods, preferred are emulsion polymerization and solution polymerization.

In the emulsion polymerization for producing the styrene-based resin (C8), there may be used any of known polymerization initiators, chain transfer agents, emulsifiers, etc.

Examples of the polymerization initiators include cumene hydroperoxide, p-menthane hydroperoxide, diisopropyl benzene hydroperoxide, tetramethylbutyl hydroperoxide, tert-butyl hydroperoxide, potassium persulfate and azobisisobutyronitrile. As the polymerization initiation assistants, there are preferably used redox-based agents such as various reducing agents, sugar-containing iron pyrophosphate compounds and sulfoxylate compounds.

Examples of the chain transfer agents include mercaptans such as octyl mercaptan, n-dodecyl mercaptan, t-dodecyl mercaptan and n-hexyl mercaptan, terpinolenes, and α-methyl styrene dimer. Examples of the emulsifiers include alkylbenzenesulfonic acid salts such as sodium dodecylbenzenesulfonate; aliphatic sulfonic acid salts such as sodium laurylsulfate; higher fatty acid salts such as potassium laurate, potassium stearate, potassium oleate and potassium palmitate; and rosinates such as potassium rosinate.

In the emulsion polymerization, the rubber polymer (a) and the vinyl-based monomer (b) may be used in the following manner. That is, the vinyl-based monomer (b) may be added at one time, or intermittently in divided parts or continuously in the presence of a whole amount of the rubber polymer (a) to polymerize both the components with each other. Alternatively, a part of the rubber polymer (a) may be added in the course of the polymerization.

After completion of the emulsion polymerization, the resulting latex is usually coagulated with a coagulant, washed with water and then dried, thereby obtaining particles of the styrene-based resin (C8). In this case, latexes of two or more kinds of the styrene-based resins (C8) obtained by the emulsion polymerization may be appropriately blended together and then coagulated. Examples of the coagulant include inorganic salts such as calcium chloride, magnesium sulfate and magnesium chloride; and acids such as sulfuric acid, hydrochloric acid, acetic acid, citric acid and malic acid.

The solvent usable when producing the styrene-based resin (C8) by the solution polymerization may be an inert polymerization solvent usually used in radical polymerization. Examples of the solvent include aromatic hydrocarbons such as ethyl benzene and toluene; ketones such as methyl ethyl ketone and acetone; acetonitrile; dimethylformamide; and N-methylpyrrolidone.

The polymerization temperature is usually 80 to 140° C. and preferably 85 to 120° C. The polymerization may be carried out using a polymerization initiator, or under heating without using the polymerization initiator. Examples of the polymerization initiator include organic peroxides such as ketone peroxides, dialkyl peroxides, diacyl peroxides, peroxyesters, hydroperoxides, azobisisobutyronitrile and benzoyl peroxide; and 1,1'-azobis(cyclohexane-1-carbonitrile). Examples of the chain transfer agent include mercaptans, terpinolenes and α-methyl styrene dimer.

When producing the styrene-based resin (C8) by bulk polymerization or suspension polymerization, there may be used the polymerization initiators, chain transfer agents, etc., as described in the above solution polymerization.

The amount of the residual monomers in the styrene-based resin (C8) produced by the above various polymerization methods is usually not more than 10,000 ppm and preferably not more than 5,000 ppm.

The styrene-based resin (C8) usually comprises a copolymer formed by graft-copolymerizing the vinyl-based monomer (b) to the rubber polymer (a), and a non-grafted component comprising no rubber polymer to which the vinyl-based monomer (b) is grafted ((co)polymer of the vinyl-based monomer (b)). The graft percentage of the styrene-based resin (C8) is usually 20 to 200% by mass, preferably 30 to 150% by mass and more preferably 40 to 120% by mass. The graft percentage may be calculated according to the following formula (III).

$$\text{Graft percentage}(\% \text{ by mass}) = \{(T-S)/S\} \times 100 \quad \text{(III)}$$

In the formula (III), T represents a mass (g) of an insoluble component obtained by charging 1 g of the styrene-based resin (C8) into 20 mL of acetone, shaking the resulting mixture using a shaker for 2 hr and then separating the mixture into the insoluble component and a soluble component using a centrifugal separator (rotating speed: 23,000 rpm); and S represents a mass (g) of a rubber polymer contained in 1 g of the styrene-based resin (C8).

The intrinsic viscosity [η] of the acetone-soluble component in the styrene-based resin (C8) (as measured at 30° C. using methyl ethyl ketone as a solvent) is usually 0.2 to 1.2 dL/g, preferably 0.2 to 1.0 dL/g and more preferably 0.3 to 0.8 dL/g. The average particle diameter of particles of the grafted rubber polymer which are dispersed in the styrene-based resin (C8) is usually 500 to 30,000 Å, preferably 1,000 to 20,000 Å and more preferably 1,500 to 8,000 Å. The average particle diameter may be measured by known method using an electron microscope.

The polymer (C) used in the present invention may be combination of two or more resins selected from the group consisting of the above polyester-based resin (C1), polyamide-based resin (C2), acrylic resin (C3), polycarbonate-based resin (C4), polyacetal-based resin (C5), polyphenylene ether-based resin (C6), polyolefin-based resin (C7) and styrene-based resin (C8). The preferred combination of these resins includes combination of the polyester-based resin (C1) and the polycarbonate-based resin (C4), combination of the polyester-based resin (C1) and the acrylic resin (C3), and combination of the acrylic resin (C3) and the polycarbonate-based resin (C4).

The preferred combinations of the styrene-based resin (C8) with the other polymers are as follows.

(1) Polyester-based resin (C1)/styrene-based resin (C8) [(C1)/(C8)=10 to 80/20 to 90% by mass (preferably 10 to 50/50 to 90% by mass)]

(2) Polyester-based resin (C1)/polycarbonate-based resin (C4)/styrene-based resin (C8) [(C1)/(C4)/(C8)=20 to 90/5 to 70/10 to 60% by mass (preferably 30 to 80/10 to 60/10 to 50% by mass)]

(3) Polyamide-based resin (C2)/styrene-based resin (C8) [(C2)/(C8)=10 to 90/10 to 90% by mass (preferably 20 to 80/20 to 80% by mass)]

In the above combination, copolymers of the above unsaturated acid compound or acid anhydride group-containing unsaturated compound are preferably used as the styrene-based resin (C8).

(4) Polycarbonate-based resin (C4)/styrene-based resin (C8) [(C1)/(C8)=10 to 90/10 to 90% by mass (preferably 30 to 80/20 to 70% by mass)]

(5) Polyphenylene ether-based resin (C6)/styrene-based resin (C8) [(C6)/(C8)=10 to 90/10 to 90% by mass (preferably 30 to 80/20 to 70% by mass)]

In addition, the preferred combinations of the above block copolymer (B) with the polymer (C) are those shown in the following Table 1.

TABLE 1

| Hard segment of block copolymer (B) | Polymer (C) |
| --- | --- |
| Polyamide | Polyamide-based resin |
|  | Styrene-based resin |
| Polyester | Polyester-based resin |
|  | Acrylic resin |
|  | Polycarbonate-based resin |
|  | Styrene-based resin |
| Polyurethane | Polyester-based resin |
|  | Polyamide-based resin |
|  | Polycarbonate-based resin |
|  | Polyacetal-based resin |
|  | Combination of polyphenylene ether-based resin and styrene-based resin |
|  | Styrene-based resin |
| Polyolefin | Polyolefin-based resin |
|  | Polyacetal-based resin |
|  | Styrene-based resin |

<Thermoplastic Polymer Composition>

The thermoplastic polymer composition of the present invention comprises 50 to 95% by mass of the above aliphatic polyester (A) and 5 to 50% by mass of the above block copolymer (B) (wherein the total amount of the above components (A) and (B) is 100% by mass).

When the content of the aliphatic polyester (A) is less than 50% by mass, effective use of the aliphatic polyester as aimed by the present invention tends to be unachievable. When the content of the aliphatic polyester (A) is more than 95% by mass, the resulting composition tends to be deteriorated in impact resistance, durability and destaticizing property. The content of the aliphatic polyester (A) in the composition is preferably 55 to 93% by mass and more preferably 60 to 90% by mass.

When the content of the block copolymer (B) is less than 5% by mass, the resulting composition tends to be deteriorated in impact resistance and durability. When the content of the block copolymer (B) is more than 50% by mass, the resulting composition tends to be deteriorated in impact resistance. The content of the block copolymer (B) in the composition is preferably 7 to 45% by mass and more preferably 10 to 40% by mass.

The polymer (C) is used as a preferred optional component. The content of the polymer (C) in the composition is usually 5 to 260 parts by mass, preferably 20 to 200 parts by mass, more preferably 25 to 150 parts by mass, still more preferably 30 to 100 parts by mass and most preferably 35 to 80 parts by mass on the basis of 100 parts by mass of the total amount of the aliphatic polyester-based resin (A) and the block copolymer (B). When the content of the polymer (C) is less than 5 parts by mass, no effect of improving the impact resistance and durability by addition of the polymer (C) tends to be attained. When the content of the polymer (C) is more than 260 parts by mass, the resulting composition tends to be deteriorated in impact resistance.

The thermoplastic polymer composition of the present invention may also comprise a compatibilizer (G) for the purpose of enhancing a compatibility between the aliphatic polyester-based resin (A) and the block copolymer (B). Examples of the compatibilizer (G) include functional group-modified products of olefin-based polymers such as polyethylene, polypropylene and ethylene-propylene copolymers; block copolymers having an aromatic vinyl compound polymer block and a conjugated diene compound polymer block, and hydrogenated products thereof; functional group-modified products of the hydrogenated products; block copolymers comprising an aromatic vinyl compound polymer block, a conjugated diene compound polymer block and an aromatic vinyl compound polymer block, and block copolymers comprising at least one block selected from the group consisting of a polyester, a polycarbonate and a polyurethane; and polystyrene block- and function group-modified styrene-based resins. Examples of the functional group include a carboxyl group, a hydroxyl group, an epoxy group, an amino group, an acid anhydride group and an oxazoline group. The method of introducing the functional group into the respective compounds is not particularly limited, and suitably includes a method of copolymerizing a functional group-containing unsaturated compound therewith, a method of adding the functional group-containing unsaturated compound thereto according to the requirements. The amount of the compatibilizer (G) used is usually 0.5 to 80 parts by mass, preferably 1 to 50 parts by mass and more preferably 2 to 30 parts by mass on the basis of 100 parts by mass of the total amount of the aliphatic polyester-based resin (A) and the block copolymer (B).

The thermoplastic polymer composition of the present invention may also comprise an alkali metal salt and/or an alkali earth metal salt (D) for the purpose of enhancing a destaticizing property thereof. The component (D) may be blended in the composition upon production thereof, specifically, either before, during or after the polymerization for producing the block copolymer (B). The block copolymer (B) comprising the component (D) is available as a commercial product.

Examples of the alkali metal in the component (D) include lithium, sodium and potassium. Examples of the alkali earth metal in the component (D) include magnesium and calcium. Examples of the salts of these metals include organic acid salts, inorganic acid salts and halides.

Specific examples of the component (D) include alkali metal halides such as lithium chloride, sodium chloride, potassium chloride, lithium bromide, sodium bromide and potassium bromide; inorganic acid salts of alkali metals such as sodium perchlorate and potassium perchlorate; organic acid salts of alkali metals such as potassium acetate and lithium stearate; alkali metal salts of alkylsulfonic acids having an alkyl group with a carbon number of 8 to 24 such as octylsulfonic acid, dodecylsulfonic acid, tetradecylsulfonic acid, stearylsulfonic acid, tetracosylsulfonic acid and 2-ethylhexylsulfonic acid; alkali metal salts of aromatic sulfonic acids such as phenylsulfonic acid and naphthylsulfonic acid; alkali metal salts of alkylbenzenesulfonic acids having an alkyl group with 6 to 18 such as octylphenylsulfonic acid, dodecylphenylsulfonic acid, dibutylphenylsulfonic acid and dinonylphenylsulfonic acid; alkali metal salts of alkylnaphthalenesulfonic acids having an alkyl group with a carbon number of 2 to 18 such as dimethylnaphthylsulfonic acid, diisopropylnaphthylsulfonic acid and dibutylnaphthylsulfonic acid; and alkali metal salts of fluorinated sulfonic acid (for example, trifluoromethanesulfonic acid). These components (D) may be used in combination of any two or more thereof. The amount of the component (D) used is usually 0.001 to 25 parts by mass, preferably 0.01 to 15 parts by mass and more preferably 0.01 to 5 parts by mass on the basis of 100 parts by mass of the thermoplastic polymer composition of the present invention (a sum of the components (A) and (B)). The concentration of the alkali metal and/or alkali earth metal in the thermoplastic polymer composition of the present invention is usually 100 to 30000 ppm and preferably 150 to 20000 ppm.

The thermoplastic polymer composition of the present invention may also comprise a salt (E) having an anion moiety comprising a fluorinated alkylsulfonyl group and a nonionic surfactant (F) for the purpose of enhancing an destaticizing property thereof.

Examples of the salt (E) having an anion moiety comprising a fluorinated alkylsulfonyl group include lithium trifluoromethanesulfonate, bis(trifluoromethanesulfonyl)imide lithium and tris(trifluoromethanesulfonyl)methane lithium. Among these salts, preferred is lithium trifluoromethanesulfonate. These salts (E) may be used in combination of any two or more thereof. The amount of the component (E) used is usually 0.01 to 10 parts by mass, preferably 0.05 to 7 parts by mass and more preferably 0.1 to 5 parts by mass on the basis of 100 parts by mass of the total amount of the aliphatic polyester-based resin (A) and the block copolymer (B). When the composition further comprises the polymer (C), the amount of the component (E) used is usually 0.01 to 10 parts by mass, preferably 0.05 to 5 parts by mass and more preferably 0.1 to 5 parts by mass on the basis of 100 parts by mass of the total amount of the aliphatic polyester-based resin (A), the block copolymer (B) and the polymer (C). The component (E) may be added in the form of an aqueous solution. Alternatively, the component (E) may also be used in the form of a master batch obtained by previously dispersing the component (E) with a high concentration in the other polymer.

Examples of the nonionic surfactant (F) include polyhydric alcohol esters, nitrogen-containing compounds (such as amine compounds and amide compounds), etc.

Examples of the polyhydric alcohol esters include glycerol esters, polyglycerol esters, sorbitan esters, ethylene glycol esters and propylene glycol esters.

Examples of the glycerol monoesters include glycerol monolaurate, glycerol monomyristate, glycerol monopalmitate, glycerol monostearate, glycerol monobehenate and glycerol monooleate. Examples of the polyglycerol esters include diglycerol monolaurate, diglycerol monomyristate, diglycerol monopalmitate, diglycerol monostearate, diglycerol monobehenate and diglycerol monooleate.

Examples of the sorbitan esters include sorbitan monooleate, sorbitan monobehenate, sorbitan monostearate, sorbitan monoisostearate, sorbitan monolaurate and sorbitan monopalmitate. Examples of the ethylene glycol esters include ethylene glycol monostearate. Examples of the propylene glycol esters include propylene glycol monostearate.

Among the above compounds, preferred are glycerol monostearate, diglycerol monostearate, glycerol monolaurate, diglycerol monolaurate and sorbitan monostearate.

Examples of the amine compounds include dialkanol amines such as lauryl diethanolamine, myristyl diethanolamine, palmityl diethanolamine, stearyl diethanolamine, oleyl diethanolamine, lauryl diisopropanolamine, myristyl diisopropanolamine, palmityl diisopropanolamine, stearyl diisopropanolamine, oleyl diisopropanolamine and N,N-bishydroxyethylalkylamines (in which the carbon number of the alkyl group is usually 12 to 22).

Examples of the amide compounds include lauryl diethanol amide, myristyl diethanol amide, palmityl diethanol amide, behenyl diethanol amide, oleyl diethanol amide, lauryl diisopropanol amide, myristyl diisopropanol amide, palmityl diisopropanol amide, stearyl diisopropanol amide and oleyl diisopropanol amide.

Among the above compounds, preferred are amine compounds, and more preferred are lauryl diethanolamine and stearyl diethanolamine.

The amount of the nonionic surfactant (F) used is usually 0.05 to 20 parts by mass, preferably 0.1 to 15 parts by mass, more preferably 0.3 to 7 parts by mass and still more preferably 0.3 to 5 parts by mass on the basis of 100 parts by mass of the total amount of the aliphatic polyester-based resin (A) and the block copolymer (B). In addition, when the composition further comprises the polymer (C), the amount of the nonionic surfactant (F) used in the composition is usually 0.05 to 20 parts by mass, preferably 0.1 to 10 parts by mass and more preferably 0.3 to 5 parts by mass on the basis of 100 parts by mass of the total amount of the aliphatic polyester-based resin (A), the block copolymer (B) and the polymer (C).

The thermoplastic polymer composition of the present invention may be appropriately blended with known additives such as weather (light)-resisting agents, antioxidants, heat stabilizers, lubricants, silicone oils, plasticizers, sliding agents, colorants, dyes, foaming agents, processing assistants (such as ultrahigh-molecular weight acrylic polymers and as ultrahigh-molecular weight styrene-based polymers), flame retardants and nucleating agents.

The thermoplastic polymer composition of the present invention may also be blended with known inorganic or organic fillers. Examples of these fillers include glass fibers, glass flakes, milled glass fibers, glass beads, hollow glass beads, carbon fibers, milled carbon fibers, silver, copper, brass, iron, carbon black, tin-coated titanium oxide, tin-coated silica, nickel-coated carbon fibers, talc, calcium carbonate, calcium carbonate whiskers, wollastonite, mica, kaolin, montmorillonite, hectorite, zinc oxide whiskers, potassium titanate whiskers, aluminum borate whiskers, plate-shaped alumina, plate-shaped silica, organic-treated smectite, aramid fibers, phenol fibers and polyester fibers. These fillers may be used in combination of any two or more thereof.

The above fillers may be treated with known coupling agents, surface-treating agents or sizing agents for the purpose of enhancing a dispersibility thereof. Examples of the coupling agents include silane-based coupling agents, titanate-based coupling agents and aluminum-based coupling agents. The amount of the filler used is usually 1 to 200 parts by mass on the basis of 100 parts by mass of the total amount of the aliphatic polyester-based resin (A) and the block copolymer (B).

The thermoplastic polymer composition of the present invention may also be appropriately blended with polyarylates, methyl methacrylate-maleimide compound copolymers, polyphenylene sulfides, thermoplastic polyurethanes, epoxy resins, phenol resins, urea resins, phenoxy resins, etc.

The thermoplastic polymer composition of the present invention may be produced by melt-kneading the above respective components using various extruders, a Banbury mixer, a kneader, a continuous kneader, a roll, etc. In the kneading treatment, the respective components may be added at one time or intermittently in divided parts.

The thermoplastic polymer composition of the present invention may be formed into a resin molded product by known molding methods such as injection molding, press molding, calender molding, T-die molding, inflation molding, lamination molding, vacuum forming and contour-extrusion molding. Examples of the resin molded product include injection-molded products, sheet molded products (including multilayer sheets), film molded products, contour-extrusion molded products and vacuum molded products.

The thus obtained resin molded products may be used in various applications including casings such as relay casings, wafer casings, reticle casings, mask casings and soft ware casings; trays such as liquid crystal trays, chip trays, memory trays, CCD trays and IC trays; carriers such as IC carriers; protective sheets for polarizing films, protective sheets used upon cutting the polarizing films, and protective films for liquid crystal displays or plasma displays; films such as semiconductor-related protective films, and protective films used in clean room; plastic corrugated boards; and internal members for automatic vending machines. In particular, the thermoplastic polymer composition of the present invention can be suitably used as various parts in the applications requiring a high performance such as automobile applications, electric and electronic applications, OA and domestic appliance applications, sanitary applications, etc., because of excellent destaticizing property, persistency of the destaticizing property, impact resistance and abrasion resistance.

EXAMPLES

The present invention is described in more detail by the following examples, but these examples are only illustrative and not intended to limit a scope of the present invention. Meanwhile, in the following examples, etc., the "part(s)" and "%" represent "part(s) by mass" and "% by mass", respectively, unless otherwise specified.

<Evaluation Methods>
(1) Gel Content of Rubber Polymer:
  Measured by the above-described method.
(2) Average Particle Diameter of Rubber Polymer Latex:
  The average particle diameter of the rubber polymer latex used for producing the styrene-based resin was measured by a light scattering method. The measurement was performed using a measuring apparatus "LPA-3100 Model" manufactured by Otsuka Denshi Co., Ltd., by a cumulant method at a cumulative frequency of 70 times. Meanwhile, if was confirmed by using an electron microscope that the diameter of particles of the grafted rubber polymer dispersed in the styrene-based resin was approximately the same as the particle diameter of the latex.
(3) Graft Percentage of Styrene-Based Resin:
  Measured by the above-described method.
(4) Intrinsic Viscosity [η] of Acetone-Soluble Component of Styrene-Based Resin:
  Measured by the above-described method.
(5) Destaticizing Property:
  A cylindrical molded product having a thickness of 2.1 mm and a diameter of 100 mm was allowed to stand at 23° C. under 50% RH for 24 hr to measure a surface resistivity (•/□) thereof. The measurement was carried out by applying a voltage of 500 V to the molded product using "High-Rester UPMCP-HT450" manufactured by Mitsubishi Chemical Corporation, according to JIS K6911.
(6) Persistency of Destaticizing Property (A):
  The molded product used in the above (5) was immersed in distilled water at 23° C. for 10 days and then allowed to stand in a thermo-hydrostat at 23° C. under 50% RH for 30 days. Thereafter, the surface resistivity (•/□) of the molded product was measured under the same conditions as used in the above (5) to evaluate a persistency of the destaticizing property.
(7) Persistency of Destaticizing Property (B):
  The molded product used in the above (5) was immersed in distilled water at 23° C. for 24 hr and then allowed to stand in a thermo-hydrostat at 23° C. under 50% RH for 7 days. Thereafter, the surface resistivity (•/□) of the molded product was measured under the same conditions as used in the above (5) to evaluate a persistency of the destaticizing property.
(8) Impact Resistance (A):
  According to ISO 179, the Charpy impact strength ($KJ/m^2$) of a molded product prepared according to the same ISO Standard was measured.
(9) Impact Resistance (B):
  A molded product having a size of 2.4 mm×50 mm×100 mm as a test piece was punched using a punching bar having a diameter of 25.4 mm and a tip end R of 25.4 mm at a punching speed of 2.4 m/sec to measure a breaking energy (J) thereof.
(10) Impact Resistance (C):
  A molded product having a size of 1.6 mm×50 mm×100 mm as a test piece was punched using a punching bar having a diameter of 25.4 mm and a tip end R of 25.4 mm at a punching speed of 2.4 m/sec to measure a breaking energy (J) thereof.
(11) Abrasion Resistance:
  According to JIS K7204, a molded product prepared according to the same JIS was subjected to Taber abrasion test to measure a Taber-volume loss (mg) thereof. The measurement was carried out using a weight of 500 g and a truck wheel CS17 at a frequency of 1000 times.
(12) Durability (A):
  The tensile strength was measured according to ISO 527. The tensile strength of the test piece under an ordinary state (Ts1) as well as the tensile strength of the test piece after allowing the test piece to stand at a temperature of 50° C. under a humidity of 90% RH for 60 days (Ts2) were measured to calculate a retention rate (%) of the tensile strength according to the following formula (III) and evaluate a durability of the test piece from the obtained retention rate. The results were evaluated according to the following three ratings: "A": retention rate of not less than 80%; "B": retention rate of not less than 50% but less than 80%; "C": retention rate of less than 50%.

$$\text{Retention Rate}(\%) = Ts2/Ts1 \times 100 \qquad \text{(III)}$$

(13) Durability (B):
  The tensile strength was measured according to ISO 527. The tensile strength of the test piece under an ordinary state (Ts0) as well as the tensile strength of the test piece after allowing the test piece to stand at a temperature of 50° C.

under a humidity of 90% RH for 60 days and then stand at a temperature of 23° C. under a humidity of 50% RH for one month (Ts1) were measured to calculate a retention rate (%) of the tensile strength according to the following formula (IV) and evaluate a durability of the test piece from the obtained retention rate. The results were evaluated according to the following three ratings: "A": retention rate of not less than 80%; "B": retention rate of not less than 50% but less than 80%; "C": retention rate of less than 50%.

$$\text{Retention Rate(\%)}=Ts1/Ts0\times100 \quad \text{(IV)}$$

<Components of Thermoplastic Polymer Composition>

(1) Aliphatic Polyester-Based Resin (A):

A1: "GSP1aAZ91T" (tradename) produced by Mitsubishi Chemical Corporation; aliphatic polyester obtained from succinic acid and 1,4-butanediol as main components A2: "TERAMACK TE-7000" (tradename) produced by Unitika Co., Ltd.; polylactic acid (2) Block Copolymer (B):

B1: Polyamide-polyethylene glycol-based block copolymer (sodium compound-containing product; sodium content: 1120 ppm) ["PELESTAT M-140" (tradename) produced by Sanyo Kasei Kogyo Co., Ltd.]

B2: Polyester-polyethylene glycol-based block copolymer (sodium compound-containing product; sodium content: 12350 ppm) ["TEP004" (tradename) produced by Takemoto Yushi Co., Ltd.]

B3: Polyester-polyethylene glycol-based block copolymer ["TEP-018-0" (tradename) produced by Takemoto Yushi Co., Ltd.]

B4: Polypropylene-polyethylene glycol-based block copolymer (sodium compound-containing product; sodium content: 4540 ppm) ["PELESTAT 303" (tradename) produced by Sanyo Kasei Kogyo Co., Ltd.]

B5: Polyolefin-polyethylene glycol-based block copolymer ["PELESTAT 201" (tradename) produced by Sanyo Kasei Kogyo Co., Ltd.]

B6: Polyurethane-polytetramethylene glycol-based block copolymer ["PANDEX T-8180" (tradename) produced by DIC Bayer Polymer Inc.]

B7: Polyurethane-polyethylene glycol-based block copolymer ["DESMOPAN TP-6580A" (tradename) produced by DIC Bayer Polymer Inc.]

B8: Sodium compound-free polyamide-polyethylene glycol block copolymer produced in the below-mentioned Production Example 1

B9: Sodium compound-free polyester-polyethylene glycol block copolymer produced in the below-mentioned Production Example 2

B10: Sodium compound-free polypropylene-polyethylene glycol block copolymer produced in the below-mentioned Production Example 3

(3) Polymer (C):

C1-1: Polyester-based resin [polybutylene terephthalate "DURANEX 800FP" (tradename) produced by Polyplastics Co., Ltd.]

C2-1: Polyamide-based resin [polyamide 6 "A1030BRL" (tradename) produced by Unitika Co., Ltd.]

C3-1: Acrylic polymer [methyl methacrylate-based polymer "PARAPET HR-1000L" (tradename) produced by Kuraray Co., Ltd.]

C4-1: Polycarbonate-based resin [bisphenol A-type polycarbonate "PANLITE L-1225WP" (tradename) produced by Teijin Kasei Co., Ltd.]

C5-1: Polyacetal-based resin [acetal copolymer "DURACON M90S" (tradename) produced by Polyplastics Co., Ltd.]

C6-1: Polyphenylene ether-based resin [polyphenylene ether obtained by oxidation coupling polymerization of 2,6-dimethyl phenol [[η] as measured at 25° C. in a chloroform solution: 0.4 dL/g] (the resin was previously melt-kneading with the below-mentioned component (C8-8) at a ratio of 50%/50%) before use.

C7-1: Polyolefin-based resin [random-type polypropylene "NOVATEC PPEG8" (tradename) produced by Japan Polypropylene Corporation]

C7-2: Polyolefin-based resin [homopolymer-type polypropylene "NOVATEC PPEA9" (tradename) produced by Japan Polypropylene Corporation]

C7-3: Polyolefin-based resin [low-density polyethylene "NOVATEC LDLF122" (tradename) produced by Japan Polyethylene Corporation]

C7-4: Polyolefin-based resin [metallocene catalyst-polymerized polyethylene "COLONEL KF290" (tradename) produced by Japan Polyethylene Corporation]

C8-1: Rubber-reinforced styrene-based resin produced in the below-mentioned Example 4

C8-2: Styrene-based resin produced in the below-mentioned Example 5

C8-3: Hydroxyl group-modified styrene-based resin produced in the below-mentioned Example 6

C8-4: Carboxyl group-modified styrene-based resin produced in the below-mentioned Example 7

C8-5: Epoxy group-modified styrene-based resin produced in the below-mentioned Example 8

C8-6: Rubber-reinforced styrene-based resin produced in the below-mentioned Example 9

C8-7: Carboxyl group-modified styrene-based resin produced in the below-mentioned Example 10

C8-8: Rubber-reinforced polystyrene ["HIPSHT-60" (tradename) produced by PS Japan Co., Ltd.

(3) Salt Having an Anion Moiety Comprising a Fluorinated Alkylsulfonyl Group (E):

E1: "SANKONOL AQ-50T" (tradename) produced by Sanko Chemical Industry Co., Ltd. (lithium salt compound content: 50%)

E2: "SANKONOL 0862-20T" (tradename) produced by Sanko Chemical Industry Co., Ltd. (20% butoxyethoxyethyl adipate solution of lithium trifluoromethanesulfonate)

E3: "SANKONOL AQ-75T" (tradename) produced by Sanko Chemical Industry Co., Ltd. (75% aqueous solution of lithium trifluoromethanesulfonate)

(4) Nonionic Surfactant (F):

"ELECTROSTRIPPER TS-5" (tradename) produced by Kao Corp.

(5) Compatibilizer (G):

G1: "TOUGH-TEC H-1041" (tradename) produced by Asahi Kasei Chemicals Co., Ltd. (hydrogenated product of styrene-butadiene-styrene block copolymer)

G2: "U-MEX 1001" (tradename) produced by Sanyo Kasei Kogyo Co., Ltd. (maleic anhydride-modified polypropylene; amount of maleic anhydride added: about 5%)

Production Example 1

A sodium compound-free polyamide-polyethylene glycol block copolymer as the block copolymer (B4) was produced by the following method.

A stainless steel autoclave was charged with 105 parts of ε-caprolactam, 17.1 parts of adipic acid, 0.3 part of "IRGANOX 1010" (tradename) produced by Ciba Specialty Chemicals Corp., as an antioxidant, and 6 parts of water. After replacing an inside of the autoclave with nitrogen, the contents of the autoclave were overheated at 220° C. while stirring for 4 hr under pressurized and closed condition to obtain 117 parts of a polyamide oligomer having a carboxyl group at both terminal ends thereof. Next, the obtained reaction product was mixed with 175 parts of polyoxyethylene glycol having a number-average molecular weight of 1,500 and 0.5 part of zirconyl acetate, and the mixture was subjected to polymerization at 245° C. under reduced pressure not higher than 1 mmHg for 5 hr. The resulting polymer was taken out in the form of strands on a belt and pelletized to obtain a polyamide-polyethylene glycol block copolymer having a reduced viscosity (ηsp/C) of 2.1.

Production Example 2

A sodium compound-free polyester-polyethylene glycol block copolymer as the block copolymer (B5) was produced by the following method.

A stainless steel autoclave was charged with 83 parts of dimethyl terephthalate, 50.5 parts of ethylene glycol, 0.3 part of "IRGANOX 1010" (tradename) produced by Ciba Specialty Chemicals Corp., as an antioxidant, and 0.2 part of tetrabutyl titanate as a transesterification catalyst. After replacing an inside of the autoclave with nitrogen, the contents of the autoclave were heated to 200° C. under normal pressures while stirring and reacted with each other for 1 hr while distilling off methanol by-produced. Next, the obtained reaction product was mixed with 50.5 parts of polyoxyethylene glycol (having a number-average molecular weight of 4,000), and further reacted for 2 hr. Then, the reaction mixture was heated to 240° C. and subjected to transesterification for 1 hr to obtain an ester. Next, after reducing a pressure of the reaction system to 1 mmHg over 1 hr, the resulting reaction solution was further subjected to condensation reaction for 3 hr, thereby obtaining a sodium compound-free polyester-polyethylene glycol block copolymer. It was confirmed that the resulting copolymer had a reduced viscosity (ηsp/C) of 2.1.

Production Example 3

A sodium compound-free polypropylene-polyethylene glycol block copolymer as the block copolymer (B6) was produced by the following method.

Eighty parts of low molecular weight polypropylene (Mn: 2,500) obtained by thermal degradation of high molecular weight polypropylene was charged into a stainless steel autoclave and melted at 160° C. Then, 7 parts of maleic anhydride and 14 parts of 12-aminodecanoic acid were added to the autoclave, and the contents of the autoclave were reacted with each other at 160° C. under a nitrogen flow while shirring for 1 hr. Thereafter, the reaction was continued at 200° C. for 20 hr to obtain a polyolefin block. It was confirmed that the polyolefin block had an acid value of 32.1 and Mn of 2,800. Next, 64 parts of the thus obtained polyolefin block, 36 parts of polyoxyethylene glycol (Mn: 2,000), 0.3 part of "IRGANOX 1010" (tradename) produced by Ciba Specialty Chemicals Corp., as an antioxidant, and 0.5 part of zirconyl acetate were added and subjected to polymerization at 230° C. under reduced pressure not higher than 1 mmHg for 4 hr to obtain a sodium compound-free polypropylene-polyethylene glycol block copolymer.

Production Example 4

A rubber-reinforced styrene-based resin (C8-1) was produced by the following method. That is, 75 parts of ion-exchanged water, 0.5 part of potassium rosinate, 0.1 part of tert-dodecyl mercaptan, 40 parts (solid content) of a polybutadiene latex (average particle diameter: 3500 Å; gel content: 85%), 15 parts of styrene and 5 parts of acrylonitrile were charged into a glass flask equipped with a stirrer under a nitrogen flow, and heated while stirring. When an inside temperature of the flask reached 45° C., a solution prepared by dissolving 0.2 part of sodium pyrophosphate, 0.01 part of ferrous sulfate heptahydrate and 0.2 part of glucose in 20 parts of ion-exchanged water were added thereto. Thereafter, 0.07 part of cumene hydroperoxide was added to the flask to initiate polymerization of the contents in the flask. After conducting the polymerization for 1 hr, 50 parts of ion-exchanged water, 0.7 part of potassium rosinate, 30 parts of styrene, 10 parts of acrylonitrile, 0.05 part of tert-dodecyl mercaptan and 0.01 part of cumene hydroperoxide were continuously added to the flask over 3 hr, and the polymerization of the contents in the flask was further continued for 1 hr, and then 0.2 part of 2,2'-methylene-bis(4-ethyl-6-tert-butyl phenol) was added to the flask to complete the polymerization. The obtained reaction product in the form of a latex was coagulated with an aqueous sulfuric acid solution, washed with water and then washed and neutralized with a potassium hydroxide aqueous solution. Further, the resulting product was washed with water and then dried to obtain a rubber-reinforced styrene-based resin (C8-1). It was confirmed that the thus obtained resin had a graft percentage of 68%, and the intrinsic viscosity [η] of an acetone-soluble component therein was 0.45 dL/g.

Production Example 5

A styrene-based resin (C8-2) was produced by the following method. That is, two jacketed polymerization reactors equipped with a ribbon blade were connected with each other, and purged with nitrogen. Thereafter, 75 parts of styrene, 25 parts of acrylonitrile and 20 parts of toluene were continuously added to the first reactor, and further a solution prepared by dissolving 0.12 part of tert-dodecyl mercaptan as a molecular weight controller in 5 parts of toluene and a solution prepared by dissolving 0.1 part of 1,1'-azobis(cyclohexane-1-carbonitrile) as a polymerization initiator in 5 parts of toluene were continuously supplied thereto. The polymerization temperature in the first reactor was controlled to 110° C., and the average residence time therein was 2.0 hr and the polymerization conversion rate therein was 57%. The resulting polymer solution was continuously withdrawn from the first reactor using a pump disposed outside of the first reactor in an amount equivalent to the total amount of styrene, acrylonitrile, toluene, the molecular weight controller and the polymerization initiator supplied thereto, and fed to the second reactor. The polymerization in the second reactor was conducted at 130° C., so that the polymerization conversion rate was 75%. The copolymer solution obtained in the second reactor was fed to a twin-screw three-stage vented extruder to directly volatilize the unreacted monomers and the solvent therefrom, thereby obtaining a styrene-based resin (C8-2) having an intrinsic viscosity [η] of 0.48 dL/g.

Production Example 6

A hydroxyl group-modified styrene-based resin (C8-3) was produced by the following method. That is, the same procedure as defined in Production Example 5 was conducted under the same conditions except that 68 parts of styrene, 22 parts of acrylonitrile and 10 parts of 2-hydroxyethyl methacrylate were used in place of 75 parts of styrene and 25 parts of acrylonitrile, thereby obtaining a hydroxyl group-modified styrene-based resin (C8-3) having an intrinsic viscosity [η] of 0.42 dL/g.

Production Example 7

A carboxyl group-modified styrene-based resin (C8-4) was produced by the following method. That is, the same procedure as defined in Production Example 6 was conducted under the same conditions except that 10 parts of methacrylic acid were used in place of 10 parts of 2-hydroxyethyl methacrylate, thereby obtaining a carboxyl group-modified styrene-based resin (C8-4) having an intrinsic viscosity [η] of 0.44 dL/g.

Production Example 8

An epoxy group-modified styrene-based resin (C8-5) was produced by the following method. That is, the same procedure as defined in Production Example 6 was conducted under the same conditions except that 10 parts of glycidyl methacrylate were used in place of 10 parts of 2-hydroxyethyl methacrylate, thereby obtaining an epoxy group-modified styrene-based resin (C8-5) having an intrinsic viscosity [η] of 0.42 dL/g.

Production Example 9

A rubber-reinforced styrene-based resin (C8-6) was produced by the following method. That is, 80 parts of ion-exchanged water, 0.5 part of potassium rosinate, 0.1 part of tert-dodecyl mercaptan, 30 parts (solid content) of a polybutadiene latex (average particle diameter: 2000 Å; gel content: 90%), 10 parts (solid content) of a styrene-butadiene copolymer latex (styrene content: 25%; average particle diameter: 6000 Å), 15 parts of styrene and 5 parts of acrylonitrile were charged into a glass flask equipped with a stirrer under a nitrogen flow, and heated while stirring. When an inside temperature of the flask reached 45° C., a solution prepared by dissolving 0.2 part of sodium pyrophosphate, 0.01 part of ferrous sulfate heptahydrate and 0.2 part of glucose in 20 parts of ion-exchanged water were added thereto. Thereafter, 0.07 part of cumene hydroperoxide was added to the flask to initiate polymerization of the contents in the flask. After conducting the polymerization for 1 hr, 50 parts of ion-exchanged water, 0.7 part of potassium rosinate, 30 parts of styrene, 10 parts of acrylonitrile, 0.05 part of tert-dodecyl mercaptan and 0.01 part of cumene hydroperoxide were continuously added to the flask over 3 hr, and the polymerization of the contents in the flask was further continued for 1 hr, and then 0.2 part of 2,2'-methylene-bis(4-ethyl-6-tert-butyl phenol) was added to the flask to complete the polymerization. The obtained reaction product in the form of a latex was coagulated with an aqueous sulfuric acid solution, washed with water and then washed and neutralized with a potassium hydroxide aqueous solution. Further, the resulting product was washed with water and then dried to obtain a rubber-reinforced styrene-acrylonitrile graft copolymer. It was confirmed that the thus obtained copolymer had a graft percentage of 68%, and the intrinsic viscosity [η] of an acetone-soluble component therein was 0.45 dL/g.

Production Example 10

A carboxyl group-modified styrene-based resin (C8-7) was produced by the following method. That is, two jacketed polymerization reactors equipped with a ribbon blade were connected with each other, and purged with nitrogen. Thereafter, 68 parts of styrene, 22 parts of acrylonitrile, 10 parts of methacrylic acid and 20 parts of toluene were continuously added to the first reactor, and further a solution prepared by dissolving 0.12 part of tert-dodecyl mercaptan as a molecular weight controller in 5 parts of toluene and a solution prepared by dissolving 0.1 part of 1,1'-azobis(cyclohexane-1-carbonitrile) as a polymerization initiator in 5 parts of toluene were continuously supplied thereto. The polymerization temperature in the first reactor was controlled to 110° C., and the average residence time therein was 2.0 hr and the polymerization conversion rate therein was 57%. The resulting polymer solution was continuously withdrawn from the first reactor using a pump disposed outside of the first reactor in an amount equivalent to the total amount of styrene, acrylonitrile, toluene, the molecular weight controller and the polymerization initiator supplied thereto, and fed to the second reactor. The polymerization in the second reactor was conducted at 130° C., so that the polymerization conversion rate was 75%. The copolymer solution obtained in the second reactor was fed to a twin-screw three-stage vented extruder to directly volatilize the unreacted monomers and the solvent therefrom, thereby obtaining a carboxyl group-modified styrene-acrylonitrile copolymer having an intrinsic viscosity [η] of 0.44 dL/g.

Examples 1 to 20 and Comparative Examples 1 to 6

A series of these Examples were concerned with thermoplastic polymer compositions capable of providing molded products having excellent destaticizing property, persistency of the destaticizing property, abrasion resistance and impact resistance. The thermoplastic polymer compositions were those comprising an aliphatic polyester-based resin (A) and a block copolymer (B) having at least one hard segment block (B1) selected from the group consisting of polyamides, polyesters and polyolefins and a soft segment block (B2) having an ether bond as essential components.

The components shown in Tables 2 to 4 were blended together at ratios shown in these Tables using a Henschel mixer, and melt-kneaded using a twin-screw extruder (cylinder set temperature: 210° C.) and then pelletized. The resulting pellets were fully dried and then injection-molded (at a cylinder set temperature of 200° C.) to obtain a test piece for evaluation of destaticizing property, persistency of the destaticizing property, abrasion resistance and impact resistance. The results are shown in Tables 5 and 6.

TABLE 2

| | Blending ratios | | | | | | | | |
|---|---|---|---|---|---|---|---|---|---|
| | Component (A) | | Component (B) | | Other components (*) | | | | | |
| Ex. No. | Kind | % by mass | Kind | % by mass | Kind | Parts | Kind | Parts | Kind | Parts |
| 1 | A1 | 88 | B2 | 12 | — | — | — | — | — | — |
| 2 | A1 | 88 | B1 | 12 | — | — | — | — | — | — |
| 3 | A1 | 88 | B4 | 12 | — | — | — | — | — | — |

TABLE 2-continued

| | Blending ratios | | | | | | | |
|---|---|---|---|---|---|---|---|---|
| | Component (A) | | Component (B) | | Other components (*) | | | | |
| Ex. No. | Kind | % by mass | Kind | % by mass | Kind | Parts | Kind | Parts | Kind | Parts |
| 4 | A1 | 75 | B2 | 25 | — | — | — | — | — | — |
| 5 | A1 | 92 | B2 | 8 | — | — | — | — | — | — |
| 6 | A1 | 88 | B9 | 12 | — | — | — | — | — | — |
| 7 | A1 | 88 | B9 | 12 | E1 | 1.5 | — | — | — | — |
| 8 | A1 | 88 | B9 | 12 | E1 | 1.5 | F | 0.5 | — | — |
| 9 | A1 | 88 | B9 | 12 | E1 | 1.5 | F | 0.5 | G1 | 10 |

Note
(*): Ratios of components blended based on 100 parts by weight of total amount of components (A) and (B)

TABLE 3

| | Blending ratios | | | | | |
|---|---|---|---|---|---|---|
| | Component (A) | | Component (B) | | | |
| Ex. No. | Kind | % by mass | Kind | % by mass | Kind | % by mass |
| 10 | A1 | 80.6 | B2 | 19.4 | — | — |
| 11 | A1 | 80.6 | B2 | 19.4 | — | — |
| 12 | A1 | 80.6 | B1 | 19.4 | — | — |
| 13 | A1 | 80.6 | B1 | 19.4 | — | — |
| 14 | A1 | 80.6 | B4 | 19.4 | — | — |
| 15 | A1 | 80.6 | B4 | 19.4 | — | — |
| 16 | A1 | 80.6 | B9 | 19.4 | — | — |
| 17 | A1 | 66.8 | B2 | 16.7 | B9 | 16.7 |
| 18 | A1 | 86.2 | B2 | 13.8 | — | — |
| 19 | A1 | 92.1 | B2 | 7.9 | — | — |
| 20 | A1 | 80.6 | B10 | 19.4 | — | — |

| | Blending ratios Component (C8) (*) | | | | | |
|---|---|---|---|---|---|---|
| Ex. No. | Kind | Parts | Kind | Parts | Kind | Parts |
| 10 | C8-1 | 30.6 | C8-2 | 19 | — | — |
| 11 | C8-1 | 30.6 | C8-2 | 14.5 | C8-5 | 16.1 |
| 12 | C8-1 | 30.6 | C8-2 | 14.5 | C8-3 | 16.1 |
| 13 | C8-1 | 30.6 | C8-2 | 14.5 | C8-4 | 16.1 |
| 14 | C8-1 | 30.6 | C8-2 | 30.6 | — | — |
| 15 | C8-1 | 30.6 | C8-2 | 30.6 | — | — |
| 16 | C8-1 | 30.6 | C8-2 | 30.6 | — | — |
| 17 | C8-1 | 33.3 | C8-2 | 33.3 | — | — |
| 18 | C8-1 | 36.2 | C8-2 | 36.2 | — | — |
| 19 | C8-1 | 15.8 | C8-2 | 15.8 | — | — |
| 20 | C8-1 | 30.6 | C8-2 | 30.6 | — | — |

| | Blending ratios Other components (*) | | | |
|---|---|---|---|---|
| Ex. No. | Kind | Parts | Kind | Parts |
| 10 | — | — | — | — |
| 11 | — | — | — | — |
| 12 | — | — | — | — |
| 13 | — | — | — | — |
| 14 | G1 | 16.1 | — | — |
| 15 | G2 | 16.1 | — | — |
| 16 | E1 | 2.42 | — | — |
| 17 | E1 | 2.42 | — | — |
| 18 | — | — | — | — |
| 19 | — | — | — | — |
| 20 | E1 | 2.42 | G1 | 16.1 |

Note
(*): Ratios of components blended based on 100 parts by weight of total amount of components (A) and (B)

TABLE 4

| | Blending ratios | | | |
|---|---|---|---|---|
| Comp. | Component (A) | | Component (B) | |
| Ex. No. | Kind | % by mass | Kind | % by mass |
| 1 | A1 | 30 | B2 | 70 |
| 2 | A1 | 99 | B2 | 1 |
| 3 | A1 | 99 | B2 | 1 |
| 4 | A1 | 45.5 | B2 | 54.5 |
| 5 | A1 | 98 | B2 | 2 |
| 6 | A1 | 35.7 | B2 | 64.3 |

| Comp. | Blending ratios Component (D) (*) | | | |
|---|---|---|---|---|
| Ex. No. | Kind | Parts | Kind | Parts |
| 1 | — | — | — | — |
| 2 | — | — | — | — |
| 3 | C8-1 | 4.17 | — | — |
| 4 | C8-1 | 17.7 | C8-2 | 17.7 |
| 5 | C8-1 | 48.0 | C8-2 | 48.0 |
| 6 | C8-1 | 21.4 | C8-2 | 21.4 |

Note
(*) Ratios of components blended based on 100 parts by weight of total amount of components (A) and (B)

TABLE 5

| | Evaluation results | | | |
|---|---|---|---|---|
| Ex. No. | Destaticizing property ($\Omega/$) | Persistency of destaticizing property ($\Omega/$) | Impact resistance (A) (KJ/m$^2$) | Abrasion resistance (mg) |
| 1 | $2 \times 10^{10}$ | $2 \times 10^{10}$ | 9 | — |
| 2 | $2 \times 10^{11}$ | $2 \times 10^{11}$ | 8 | — |
| 3 | $9 \times 10^{9}$ | $9 \times 10^{9}$ | 8 | — |
| 4 | $5 \times 10^{9}$ | $5 \times 10^{9}$ | 11 | — |
| 5 | $3 \times 10^{11}$ | $3 \times 10^{11}$ | 9 | — |
| 6 | $6 \times 10^{11}$ | $6 \times 10^{11}$ | 9 | — |
| 7 | $7 \times 10^{9}$ | $7 \times 10^{9}$ | 9 | — |
| 8 | $4 \times 10^{9}$ | $4 \times 10^{9}$ | 9 | — |
| 9 | $2 \times 10^{9}$ | $2 \times 10^{9}$ | 14 | — |
| 10 | $9 \times 10^{9}$ | $9 \times 10^{9}$ | 30 | 15 |
| 11 | $9 \times 10^{9}$ | $9 \times 10^{9}$ | 35 | 12 |
| 12 | $4 \times 10^{10}$ | $4 \times 10^{10}$ | 28 | 17 |
| 13 | $6 \times 10^{10}$ | $6 \times 10^{10}$ | 25 | 19 |
| 14 | $4 \times 10^{9}$ | $4 \times 10^{9}$ | 27 | 11 |
| 15 | $4 \times 10^{9}$ | $4 \times 10^{9}$ | 27 | 16 |
| 16 | $8 \times 10^{8}$ | $8 \times 10^{8}$ | 30 | 15 |
| 17 | $5 \times 10^{7}$ | $5 \times 10^{7}$ | 33 | 19 |
| 18 | $8 \times 10^{10}$ | $8 \times 10^{10}$ | 30 | 10 |
| 19 | $4 \times 10^{11}$ | $4 \times 10^{11}$ | 32 | 9 |
| 20 | $9 \times 10^{8}$ | $9 \times 10^{8}$ | 27 | 11 |

TABLE 6

| Comp. Ex. No. | Destaticizing property ($\Omega/$) | Persistency of destaticizing property ($\Omega/$) | Impact resistance (A) (KJ/m$^2$) | Abrasion resistance (mg) |
|---|---|---|---|---|
| 1 | $7 \times 10^8$ | $9 \times 10^8$ | 2 | — |
| 2 | $<1 \times 10^{13}$ | $<1 \times 10^{13}$ | 3 | — |
| 3 | $<1 \times 10^{13}$ | $<1 \times 10^{13}$ | 4 | 15 |
| 4 | $1 \times 10^{10}$ | $1 \times 10^{10}$ | 27 | 39 |
| 5 | $<1 \times 10^{13}$ | $<1 \times 10^{13}$ | 32 | 14 |
| 6 | $9 \times 10^8$ | $9 \times 10^8$ | 12 | 52 |

From the results shown in Tables 2 to 6, the followings are apparently recognized.

(1) Examples 1 to 10 and Comparative Examples 1 and 2 are concerned with thermoplastic polymer compositions mainly comprising the aliphatic polyester-based resin (A) and the block copolymer (B). The thermoplastic polymer compositions of Examples 1 to 10 were excellent in destaticizing property, persistency of the destaticizing property and impact resistance. On the other hand, in Comparative Example 1, the amount of the component (A) used was smaller than the specific range as defined by the present invention, and the thermoplastic polymer composition of Comparative Example 1 was deteriorated in impact resistance. In Comparative Example 2, the amount of the component (A) used was larger than the specific range as defined by the present invention, and the thermoplastic polymer composition of Comparative Example 2 was deteriorated in destaticizing property and impact resistance.

(2) Examples 11 to 21 and Comparative Examples 3 to 6 are concerned with thermoplastic polymer compositions mainly comprising the aliphatic polyester-based resin (A), the block copolymer (B) and the styrene-based resin (C8). The thermoplastic polymer compositions of Examples 11 to 21 were excellent in destaticizing property, persistency of the destaticizing property, impact resistance and abrasion resistance. On the other hand, in Comparative Example 3, the amount of the component (A) used was larger than the specific range as defined by the present invention, and the amount of each of the components (B) and (C8) was smaller than the specific range as defined by the present invention, so that the thermoplastic polymer composition of Comparative Example 3 was deteriorated in destaticizing property and impact resistance.

In Comparative Example 4, the amount of the component (A) used was smaller than the specific range as defined by the present invention, and the amount of the component (C8) used was larger than the specific range as defined by the present invention, so that the thermoplastic polymer composition of Comparative Example 4 was deteriorated in abrasion resistance. In Comparative Example 5, the amount of the component (B) used was smaller than the specific range as defined by the present invention, so that the thermoplastic polymer composition of Comparative Example 5 was deteriorated in destaticizing property. In Comparative Example 6, the amount of the component (B) used was larger than the specific range as defined by the present invention, so that the thermoplastic polymer composition of Comparative Example 6 was deteriorated in impact resistance and abrasion resistance.

Examples 21 to 31 and Comparative Examples 7 and 8

A series of these Examples were concerned with thermoplastic polymer compositions capable of providing molded products having excellent destaticizing property, persistency of the destaticizing property, impact resistance and durability. The thermoplastic polymer compositions were those comprising an aliphatic polyester-based resin (A) and a block copolymer (B) having a hard segment block (B1) comprising a polyurethane and a soft segment block (B2) having an ether bond as essential components.

The components for the respective thermoplastic polymer compositions as shown in Table 7 except for the component (E) were blended together at ratios shown in the Table using a Henschel mixer, and melt-kneaded using a twin-screw extruder (cylinder set temperature: 200° C.) and then pelletized. Meanwhile, the component (E) was introduced into the extruder from a mid portion thereof using a pump.

The resulting pellets were fully dried and then formed into a molded product using an injection molding machine whose cylinder was set at a temperature of 150 to 190° C. The thus formed molded product was used to evaluate a destaticizing property, a persistency of the destaticizing property and durability thereof. The results are shown in Table 8.

TABLE 7

| | Blending ratios | | | |
|---|---|---|---|---|
| | Component (A) | | Component (B) | |
| No. | Kind | Parts | Kind | Parts |
| Ex. No. | | | | |
| 21 | A1 | 90 | B7 | 10 |
| 22 | A2 | 90 | B7 | 10 |
| 23 | A1 | 85 | B7 | 15 |
| 24 | A1 | 85 | B7 | 15 |
| 25 | A1 | 85 | B7 | 15 |
| 26 | A1 | 85 | B7 | 15 |
| 27 | A1 | 60 | B7 | 40 |
| 28 | A2 | 60 | B7 | 15 |
| | A1 | 25 | | |
| 29 | A1 | 78 | B7 | 22 |
| 30 | A1 | 23 | B7 | 22 |
| | A2 | 55 | | |
| 31 | A1 | 78 | B7 | 22 |
| Comp. Ex. No. | | | | |
| 7 | A1 | 98 | B7 | 2 |
| 8 | A1 | 20 | B7 | 80 |

| | Blending ratios | | | |
|---|---|---|---|---|
| | Component (C8) | | Component (E) | |
| No. | Kind | Parts | Kind | Parts |
| Ex. No. | | | | |
| 21 | — | — | — | — |
| 22 | — | — | — | — |
| 23 | — | — | — | — |
| 24 | — | — | — | — |
| 25 | — | — | E2 | 2(0.4) |
| 26 | — | — | E3 | 0.53(0.4) |
| 27 | — | — | E3 | 0.53(0.4) |
| 28 | — | — | E3 | 0.53(0.4) |
| 29 | C8-1 | 25 | — | — |
| | C8-2 | 25 | | |
| 30 | C8-1 | 25 | — | — |
| | C8-2 | 25 | | |
| 31 | C8-1 | 25 | E3 | 0.53(0.4) |
| | C8-2 | 25 | | |
| Comp. Ex. No. | | | | |
| 7 | — | — | — | — |
| 8 | — | — | — | — |

TABLE 8

| | Evaluation results | | | |
|---|---|---|---|---|
| No. | Destaticizing property (B) ($\Omega/$) | Persistency of destaticizing property (B) ($\Omega/$) | Impact resistance (B) (J) | Durability (A) |
| Ex. No. | | | | |
| 21 | $2 \times 10^{11}$ | $2 \times 10^{11}$ | 21 | B |
| 22 | $1 \times 10^{11}$ | $1 \times 10^{11}$ | 18 | B |
| 23 | $5 \times 10^{10}$ | $5 \times 10^{10}$ | 36 | A |
| 24 | $9 \times 10^{10}$ | $9 \times 10^{10}$ | 37 | A |
| 25 | $4 \times 10^{9}$ | $4 \times 10^{9}$ | 32 | A |
| 26 | $4 \times 10^{9}$ | $4 \times 10^{9}$ | 36 | A |
| 27 | $4 \times 10^{7}$ | $4 \times 10^{7}$ | 42 | A |
| 28 | $4 \times 10^{9}$ | $4 \times 10^{9}$ | 38 | A |
| 29 | $1 \times 10^{9}$ | $1 \times 10^{9}$ | 46 | A |
| 30 | $3 \times 10^{9}$ | $3 \times 10^{9}$ | 48 | A |
| 31 | $2 \times 10^{8}$ | $2 \times 10^{8}$ | 46 | A |
| Comp. Ex. No. | | | | |
| 7 | $>1 \times 10^{13}$ | $>1 \times 10^{13}$ | 2 | C |
| 8 | $8 \times 10^{9}$ | $8 \times 10^{9}$ | 15 | A |

From the results shown in Tables 7 and 8, the followings are apparently recognized. That is, the molded products obtained in Examples 21 to 31 were produced from the thermoplastic polymer compositions according to the present invention, and were therefore excellent in destaticizing property, a persistency of the destaticizing property, impact resistance and durability. On the other hand, in Comparative Example 7, the amount of the component (A) used was larger than the specific range as defined by the present invention, and the amount of the component (B) used was smaller than the specific range as defined by the present invention, so that the thermoplastic polymer composition of Comparative Example 7 was deteriorated in destaticizing property, impact resistance and durability. In Comparative Example 8, the amount of the component (A) used was smaller than the specific range as defined by the present invention, and the amount of the component (B) used was larger than the specific range as defined by the present invention, so that the thermoplastic polymer composition of Comparative Example 8 tended to be deteriorated in impact resistance.

Examples 32 to 48 and Comparative Examples 9 to 11

A series of these Examples were concerned with thermoplastic polymer compositions capable of providing molded products having excellent impact resistance and durability. The thermoplastic polymer compositions were those comprising the above aliphatic polyester-based resin (A), block copolymer (B) and polymer (C) as essential components.

The respective components as shown in Tables 9 and 10 were blended together at ratios shown in these Tables using a Henschel mixer, and melt-kneaded using a twin-screw extruder (cylinder set temperature: 200 to 240° C.) and then pelletized. The resulting pellets were fully dried and then injection-molded (at a cylinder set temperature of 150 to 200° C.) to obtain a test piece for evaluation of impact resistance and durability. The results are shown in Tables 9 and 10.

TABLE 9

| | Blending ratios | | | | | |
|---|---|---|---|---|---|---|
| | Component (A) | | | | Component (B) | |
| Ex. No. | Kind | Parts | Kind | Parts | Kind | Parts |
| 32 | A1 | 71 | — | — | B4 | 29 |
| 33 | A1 | 71 | — | — | B4 | 29 |
| 34 | A1 | 71 | — | — | B5 | 29 |
| 35 | A1 | 71 | — | — | B5 | 29 |
| 36 | A1 | 28 | A2 | 43 | B4 | 29 |
| 37 | A1 | 82 | — | — | B4 | 18 |
| 38 | A1 | 92 | — | — | B4 | 8 |
| 39 | A1 | 83 | — | — | B4 | 17 |
| 40 | A1 | 59 | — | — | B4 | 41 |
| 41 | A1 | 71 | — | — | B1 | 29 |
| 42 | A1 | 72 | — | — | B1 | 28 |
| 43 | A1 | 71 | — | — | B3 | 29 |
| 44 | A1 | 71 | — | — | B3 | 29 |
| 45 | A1 | 71 | — | — | B3 | 29 |
| 46 | A1 | 71 | — | — | B1 | 29 |
| 47 | A1 | 71 | — | — | B5 | 29 |
| 48 | A1 | 72 | — | — | B6 | 28 |

| | Blending ratios Component (C) except for component (C8) | | | | | |
|---|---|---|---|---|---|---|
| Ex. No. | Kind | Parts | Kind | Parts | Kind | Parts |
| 32 | C7-1 | 43 | — | — | — | — |
| 33 | C7-2 | 43 | — | — | — | — |
| 34 | C7-3 | 43 | — | — | — | — |
| 35 | C7-4 | 43 | — | — | — | — |
| 36 | C7-1 | 43 | — | — | — | — |
| 37 | C7-1 | 18 | — | — | — | — |
| 38 | C7-1 | 8 | — | — | — | — |
| 39 | C7-1 | 67 | — | — | — | — |
| 40 | C7-1 | 18 | — | — | — | — |
| 41 | C2-1 | 43 | — | — | — | — |
| 42 | C2-1 | 22 | — | — | — | — |
| 43 | C3-1 | 43 | — | — | — | — |
| 44 | C3-1 | 14 | C4-1 | 29 | — | — |
| 45 | C3-1 | 14 | C4-1 | 14 | C1-1 | 14 |
| 46 | C6-1 | 43 | — | — | — | — |
| 47 | C5-1 | 43 | — | — | — | — |
| 48 | C1-1 | 14 | C4-1 | 14 | — | — |

| | Blending ratios Component (C8) | | | | Evaluation results | |
|---|---|---|---|---|---|---|
| Ex. No. | Kind | Parts | Kind | Parts | Impact resistance (C) (J) | Durability (B) |
| 32 | — | — | — | — | 25 | A |
| 33 | — | — | — | — | 20 | A |
| 34 | — | — | — | — | 25 | A |
| 35 | — | — | — | — | 27 | A |
| 36 | — | — | — | — | 28 | A |
| 37 | — | — | — | — | 23 | A |
| 38 | — | — | — | — | 16 | B |
| 39 | — | — | — | — | 26 | A |
| 40 | — | — | — | — | 22 | A |
| 41 | — | — | — | — | 30 | A |
| 42 | C8-6 | 11 | C8-7 | 11 | 32 | A |
| 43 | — | — | — | — | 12 | A |
| 44 | — | — | — | — | 23 | A |
| 45 | — | — | — | — | 25 | A |
| 46 | — | — | — | — | 22 | A |
| 47 | — | — | — | — | 20 | A |
| 48 | C8-6 | 13 | — | — | 32 | A |

TABLE 10

| Comp. Ex. No. | Blending ratios | | | | | |
|---|---|---|---|---|---|---|
| | Component (A) | | | | Component (B) | |
| | Kind | Parts | Kind | Parts | Kind | Parts |
| 9 | A1 | 97 | — | — | B4 | 3 |
| 10 | A1 | 96 | — | — | B4 | 4 |
| 11 | A1 | 25 | — | — | B4 | 75 |

| Comp. Ex. No. | Blending ratios Component (C) except for component (C8) | | | | | |
|---|---|---|---|---|---|---|
| | Kind | Parts | Kind | Parts | Kind | Parts |
| 9 | C7-1 | 3 | — | — | — | — |
| 10 | C7-1 | 92 | — | — | — | — |
| 11 | C7-1 | 25 | — | — | — | — |

| Comp. Ex. No. | Blending ratios Component (C8) | | | | Evaluation results | |
|---|---|---|---|---|---|---|
| | | | | | Impact resistance | Durability |
| | Kind | Parts | Kind | Parts | (C) (J) | (B) |
| 9 | — | — | — | — | 1 | C |
| 10 | — | — | — | — | 2 | C |
| 11 | — | — | — | — | 9 | B |

From the results shown in Tables 9 and 10, the followings are apparently recognized. That is, the molded products of Examples 32 to 48 were obtained from the thermoplastic polymer compositions according to the present invention, and were therefore excellent in impact resistance and durability. On the other hand, in Comparative Example 9, the amount of the component (A) used was larger than the specific range as defined by the present invention, and the amount of each of the components (B) and (C) used was smaller than the specific range as defined by the present invention, so that the thermoplastic polymer composition of Comparative Example 9 was deteriorated in impact resistance and durability. In Comparative Example 10, the amount of the component (B) used was smaller than the specific range as defined by the present invention, so that the thermoplastic polymer composition of Comparative Example 10 was deteriorated in impact resistance and durability. In Comparative Example 11, the amount of the component (B) used was larger than the specific range as defined by the present invention, so that the thermoplastic polymer composition of Comparative Example 11 was deteriorated in impact resistance.

The invention claimed is:

1. A thermoplastic polymer composition comprising:
   (A) 50 to 95% by mass of a polylactic acid-based resin
   (B) 5 to 50% by mass of a block copolymer comprising (B1) a hard segment block comprising at least one polymer selected from the group consisting of a polyamide, a polyester, a polyolefin and a polyurethane, and (B2) a soft segment block having an ether bond, with the proviso that a total amount of the components (A) and (B) is 100% by mass, and
   (C) at least one polymer selected from the group consisting of (C1) a polyester-based resin (except for the components (A) and (B)), (C2) a polyamide-based resin (except for the component (B)), (C3) an acrylic polymer, (C4) a polycarbonate-based resin, (C5) a polyacetal-based resin, (C6) a polyphenylene ether-based resin, (C7) a polyolefin-based resin (except for the component (B)) and (C8) a styrene-based resin, wherein the content of the at least one polymer in the composition is 5 to 260 parts by mass on the basis of 100 parts by mass of the total amount of the aliphatic polyester-based resin (A) and the block copolymer (B).

2. A thermoplastic polymer composition according to claim 1 wherein the component (C) is the styrene-based resin (C8).

3. A thermoplastic polymer composition according to claim 2, wherein the styrene-based resin (C8) is a polymer obtained by polymerizing an aromatic vinyl compound with a vinyl cyanide compound in the presence of a rubber polymer.

4. A thermoplastic polymer composition according to claim 3, wherein the hard segment of the component (B) is a polyurethane.

5. A thermoplastic polymer composition according to claim 1, wherein the hard segment of the component (B) is a polyurethane.

6. A molded product comprising the thermoplastic polymer composition as defined in claim 1.

* * * * *